(12) United States Patent
Nagahama

(10) Patent No.: US 10,623,602 B2
(45) Date of Patent: Apr. 14, 2020

(54) IMAGE READING APPARATUS FOR RECOGNIZING, CORRECTING AND ARRAYING CARD IMAGE DATA

(71) Applicant: KYOCERA Document Solutions Inc., Osaka (JP)

(72) Inventor: Hiroyuki Nagahama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 179 days.

(21) Appl. No.: 15/983,783

(22) Filed: May 18, 2018

(65) Prior Publication Data

US 2018/0338064 A1 Nov. 22, 2018

(30) Foreign Application Priority Data

May 19, 2017 (JP) ................................ 2017-099660

(51) Int. Cl.
*H04N 1/00* (2006.01)
*H04N 1/387* (2006.01)
*H04N 1/203* (2006.01)
*H04N 1/10* (2006.01)

(52) U.S. Cl.
CPC ............ *H04N 1/3878* (2013.01); *H04N 1/10* (2013.01); *H04N 1/2038* (2013.01); *H04N 1/3873* (2013.01)

(58) Field of Classification Search
CPC .. H04N 1/3878; H04N 1/2038; H04N 1/2032; H04N 1/2036; H04N 1/4095
See application file for complete search history.

(56) References Cited

U.S. PATENT DOCUMENTS

| | | | | |
|---|---|---|---|---|
| 2006/0088214 A1* | 4/2006 | Handley | ............ | G06K 9/00469 382/176 |
| 2009/0009825 A1* | 1/2009 | Honda | ................ | H04N 1/3878 358/488 |
| 2009/0166441 A1* | 7/2009 | Chou | ...................... | G06T 3/608 235/494 |
| 2010/0315689 A1* | 12/2010 | Hayakawa | ......... | H04N 1/00681 358/474 |
| 2015/0379300 A1* | 12/2015 | Terada | ............... | G06K 9/00469 726/28 |
| 2017/0098297 A1* | 4/2017 | Takemura | ................ | G06K 9/52 |

FOREIGN PATENT DOCUMENTS

| | | |
|---|---|---|
| EP | 3 151 165 A1 | 9/2016 |
| JP | 2005-217509 A | 8/2005 |

* cited by examiner

*Primary Examiner* — Benjamin O Dulaney
(74) *Attorney, Agent, or Firm* — Stein IP, LLC

(57) ABSTRACT

The image reading apparatus includes: an image reading unit which reads card-like document sheets; a card-image recognition part which recognizes card images corresponding to the document sheets; a circular-area setting part which sets circular areas each containing a card image; a positional-information setting part which sets positional information as to the circular areas; a deviational-angle computation part which determines deviational angles of the card images; a corrected-data acquisition part which acquires corrected image data by turning the circular areas; and an array processing part which generates arrayed image data in which the card images corrected in terms of deviational inclination are disposed in array.

14 Claims, 14 Drawing Sheets

IMAGE READING APPARATUS FOR RECOGNIZING, CORRECTING AND ARRAYING CARD IMAGE DATA

INCORPORATION BY REFERENCE

This application is based upon and claims the benefit of priority from the corresponding Japanese Patent Application No. 2017-099660, filed May 19, 2017, the entire contents of which are incorporated herein by reference.

BACKGROUND

The present disclosure relates to an image reading apparatus for reading a document to generate image data, as well as to an image reading system and an image-reading-apparatus control method.

An image reading apparatus reads a set document to generate image data. Among image reading apparatuses, some are capable of performing detections as to the document. Based on a detection result, the apparatus performs setting of a reading range or adjustment (processing) of image data obtained from the reading. For example, there has been known a document reading apparatus, as described below, which is enabled to detect size, position and inclination of the document.

The known document reading apparatus, specifically, includes a document presser plate having a pattern inscribed on its contact-side surface for pressing a document placed on a document base, and the apparatus performs the following sequential processing. That is, the document reading apparatus: reads an image on the document base; processes the document on the document base and the pattern of the document presser plate, both of which have been read during the document reading process, collectively as data for processing; recognizes, based on the processed data, part of the pattern of the document presser plate concealed by the document; detects size, position and inclination of the document; and performs clipping and inclination correction of the read document by making use of the detected size, position and inclination of the document.

Some of image reading apparatuses include a contact glass. A document is set on the contact glass. The image reading apparatus reads (scans) the set document. The image reading apparatus generates image data of the read-over document.

In some cases, a plurality of document sheets may be set on the contact glass. As an example, small document sheets (small-sized document sheets) such as business cards or other cards may be set in plurality. The user sets small-sized document sheets on the contact glass so as to avoid overlap between those document sheets. As a result of reading, one sheet of image data including images of plural small-sized document sheets is obtained.

Based on a position of a set small-sized document sheet, a position of the image of the small-sized document sheet within image data is determined. Also, based on an angle of a set small-sized document sheet, an inclination of the image of the small-sized document sheet within the image data is determined. In some cases, it is desired to obtain image data in which images of individual small-sized document sheets are arrayed in an orderly fashion. In other cases, it is desired to obtain image data in which angles of individual images of small-sized document sheets are equalized to one another.

In these cases, the user is necessitated to set a plurality of small-sized document sheets on the contact glass while keeping the document sheets congruous in position and angle with one another. For example, the user is necessitated to set the small-sized document sheets so that all of the document sheets are equally angled to one another. The user is necessitated to carefully set the small-sized document sheets on the contact glass. The contact glass has a smooth surface. The set small-sized document sheets tend to move. Only a breathing, as an example, may cause a small-sized document sheet to be turned. These are quite troublesome. Thus, it is quite difficult, problematically, to obtain image data in which images of individual small-sized document sheets are equal in angle with one another and moreover in which. images of the individual small-sized document sheets are arrayed in an orderly fashion.

SUMMARY

An image reading apparatus according to this disclosure includes an operation unit, an image reading unit, a card-image recognition part, a circular-area setting part, a positional-information setting part, a deviational-angle computation part, a corrected-data acquisition part, and an array processing part. The operation unit accepts an operation by a user. The image reading unit reads a plurality of document sheets set on a contact glass to generate read image data. The card-image recognition part recognizes card images which are included in the read image data and which are images corresponding to the document sheets, respectively. The circular-area setting part sets circular areas each containing a whole one of the card images on a card-image basis. The positional-information setting part sets positional information representing positions of the individual circular areas. The deviational-angle computation part determines deviational angles of the card images relative to a predetermined direction on a card-image basis. The corrected-data acquisition part acquires corrected image data including the card images which have been corrected in terms of deviational inclination by turning the circular areas, respectively, based on the positional information and the deviational angles. The array processing part generates arrayed image data in which the card images corrected in terms of deviational inclination are disposed in array based on the corrected image data.

Further features and advantages of this disclosure will become more apparent from the description of embodiments given below.

DETAILED DESCRIPTION

The present disclosure facilitates acquisition of image data in which images of individual document sheets are aligned with no inclinations or positional deviations theraamong, even though the plural document sheets are not set with identicalness in position and angle with one another. Hereinbelow, an image reading system 100, as well as an image reading apparatus, according to an embodiment will be described with reference to FIGS. 1 to 19. The image reading apparatus will be exemplified by a multifunction peripheral 200 below. Individual components such as configuration and array of this embodiment described in its description below should be construed merely as an explanatory example and as not limiting the scrape of claims of the disclosure.

The multifunction peripheral is enabled to read a plurality of card-like document sheets which are set on a document base (contact glass 41). The card-like document sheets are small-sized document sheets. The card-like document sheets are smaller than image data of a minimum size that can be printed or outputted. For example, the card-like document sheets are business cards. The card-like document sheets are not limited to business cards. The card-like document sheets may also be publicly issued ones such as licenses, certificates and passports. Also, the card-like document sheets are not limited to publicly issued ones. The card-like document sheets may also be cards such as membership cards. The card-like document sheets need only to be settable in some plurality on the contact glass 41.

(Image Reading System 100 and Multifunction Peripheral 200)

Figure 1:
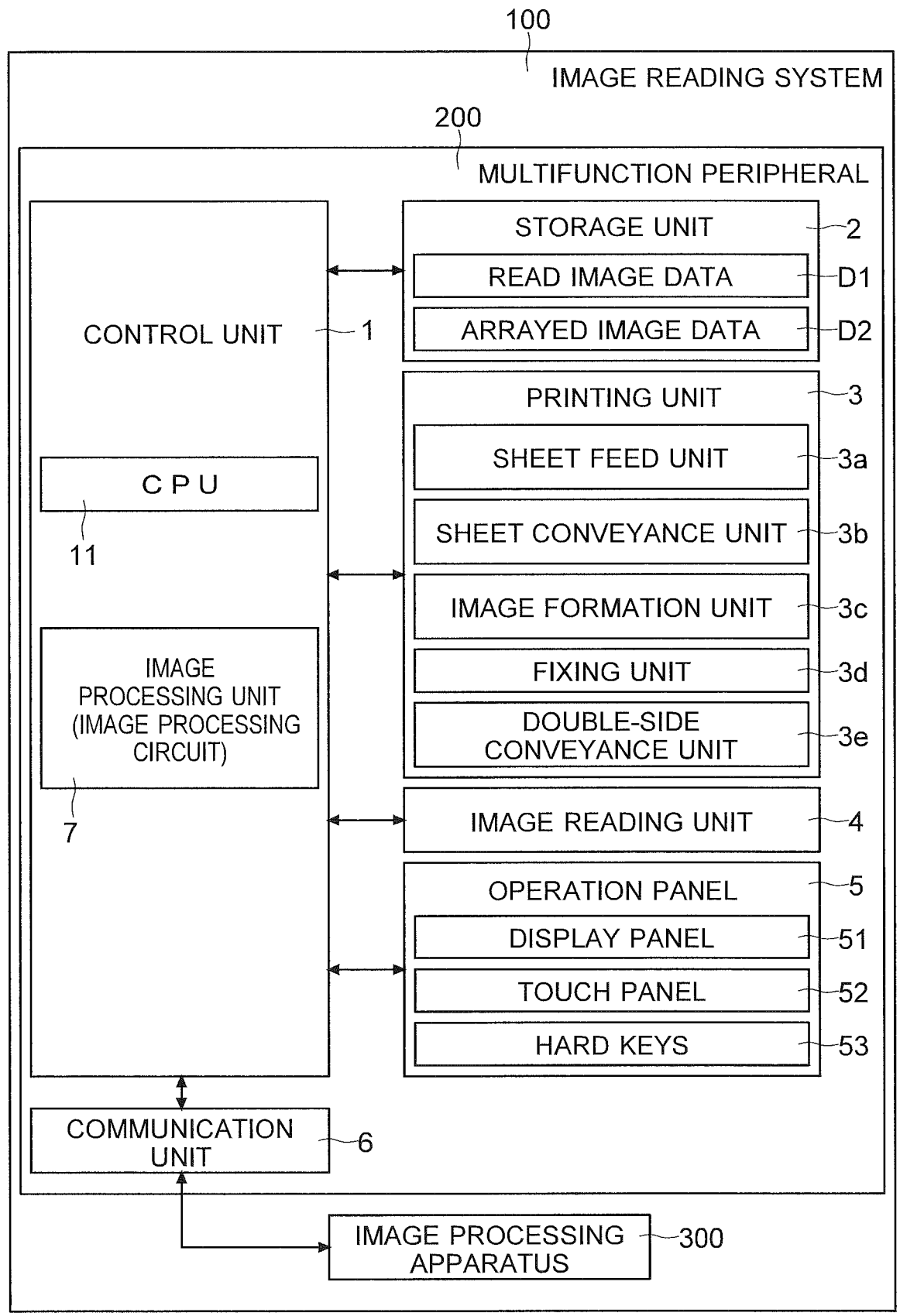
FIG. 1 is a view showing an example of an image reading system according to an embodiment.

The image reading system 100 according to this embodiment will be described below with reference to FIG. 1. As shown in FIG. 1, the image reading system 100 includes a multifunction peripheral 200 and an image processing apparatus 300. The image processing apparatus 300 is a computer enabled to fulfill turning processing of image data. The image processing apparatus 300 includes hardware and software for fulfilling turning processing of image data. The image processing apparatus 300 is a PC (Personal Computer) as an example.

As shown in FIG. 1, the multifunction peripheral 200 includes a control unit 1, a storage unit 2, a printing unit 3, an image reading unit 4, an operation panel 5, and a communication unit 6 (corresponding to corrected-data acquisition part).

The control unit 1 administers overall control over the multifunction peripheral 200. The control unit 1 includes a CPU 11 and an image processing unit 7. The storage unit 2 includes nonvolatile storage devices such as ROM, flash ROM, and storage (HDD). The storage unit 2 includes a volatile storage device such as RAM. The control unit 1 controls individual sections with use of programs and data stored in the storage unit 2. The control unit 1 also controls scan operations in such jobs as copying and transmission. The control unit 1 further controls printing, transmission, and storage of image data. The image processing unit 7 is an image processing circuit. The image processing unit 7 performs image processing on image data.

The printing unit 3 includes a sheet feed unit 3a, a sheet conveyance unit 3b, an image formation unit 3c, a fixing unit 3d, and a double-side conveyance unit 3e. For a print job, the control unit 1 instructs the sheet feed unit 3a to feed out a paper sheet. The control unit 1 instructs the sheet conveyance unit 3b to convey the sheet. The sheet conveyance unit 3b discharges a printed sheet out of the multifunction peripheral machine. The control unit 1 instructs the image formation unit 3c to form a toner image based on image data. The control unit 1 also instructs the image formation unit 3c to perform transfer of the toner image onto the conveyed sheet. The control unit 1 instructs the fixing unit 3d to fix the transferred toner image on the sheet. The control unit 1 controls operation of the printing unit 3.

The double-side conveyance unit 3e is used in double-side printing. In double-side printing, the control unit 1 instructs the double-side conveyance unit 3e to convey a one-side-printed sheet. The double-side conveyance unit 3e includes a plurality of conveyance roller pairs, and motors for rotating the conveyance roller pairs, respectively. The double-side conveyance unit 3e reverses the one-side-printed sheet, inversely between top and back, that has passed through the fixing unit 3d. For this reversal, the double-side conveyance unit 3e switches back the sheet. Then, the double-side conveyance unit 3e conveys the top/back reversed sheet toward the upstream side of the image formation unit 3c. The control unit 1 instructs the image formation unit 3c to print on the unprinted side of the one-side-printed sheet. The control unit 1 instructs the fixing unit 3d to perform a second-time toner image fixation. The control unit 1 instructs the sheet conveyance unit 3b to discharge the double-side printed sheet.

The operation panel 5 includes a display panel 51 (corresponding to display part), a touch panel 52 (corresponding to operation unit), and hard keys 53 (corresponding to operation unit). The control unit 1 instructs the display panel 51 to display a setting screen and operational images. For example, the operational images are buttons, keys and tabs. Based on an output of the touch panel 52, the control unit 1 recognizes an operated one out of the displayed operational images. The hard keys 53 include a start key and ten keys. The touch panel 52 and the hard keys 53 accept setting operations (job-related operations) by the user. The control unit 1 communicates with the operation panel 5. The control unit 1 recognizes setting contents.

The communication unit 6 is communicatably connected to the image processing apparatus 300. The communication unit 6 and the image processing apparatus 300 communicate with each other via a network. Details of the image processing apparatus 300 will be described later.

(Image Reading Unit 4)

Next, the image reading unit 4 according to this embodiment will be described with reference to FIGS. 2 and 3. The contact glass 41 is placed on a top-face right side of the image reading unit 4. Document sheets are set on the contact glass 41. The image reading unit 4 applies light to the document sheets set on the contact glass 41. The image processing unit 7 reads lower-side surfaces of the document sheets to generate read image data D1 (table reading). The storage unit 2 stores therein the read image data D1. The read image data D1 is stored in a storage of the storage unit 2 as an example.

Figure 2:
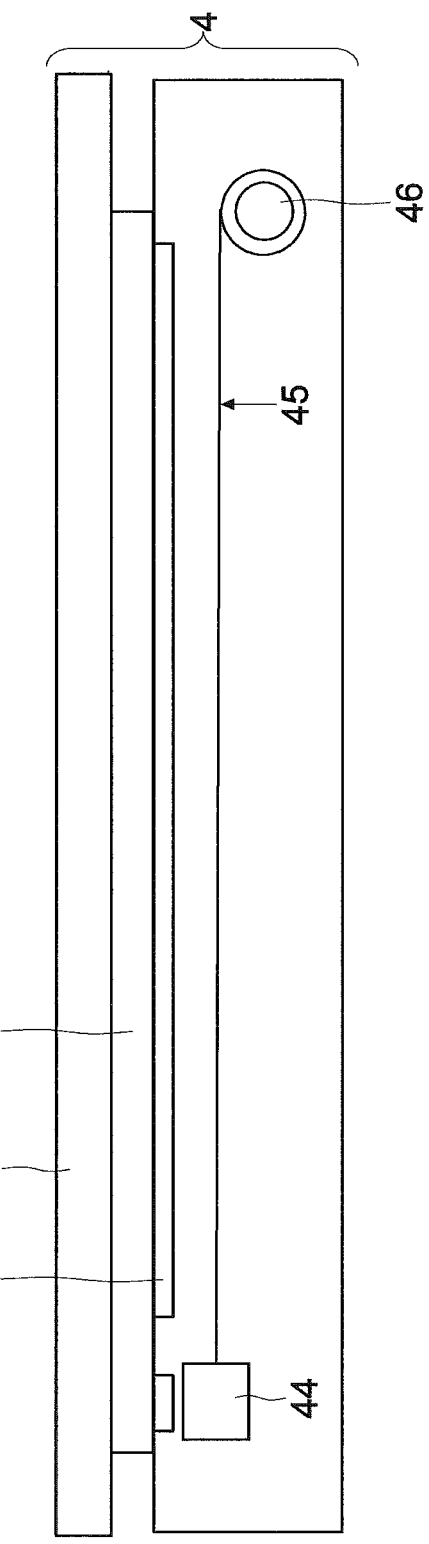
FIG. 2 is a view showing an example of an image reading unit according to the embodiment.

As shown in FIG. 2, a document presser part 42 is provided upward in the image reading unit 4. A pivot (hinge, not shown) is provided on top of the image reading unit 4 and on a deeper side of the multifunction peripheral 200 so that the document presser part 42 can be opened and closed. A front-side portion of the document presser part 42, which is on the near-the-operator front side of the multifunction peripheral 200, serves as a free end. The document presser part 42 can be opened and closed in a way that its front side of the multifunction peripheral 200 is swung up and down. A document presser plate 43 is attached to a lower surface of the document presser part 42. The document presser plate 43 is a white-colored plate as an example. When the document presser part 42 is closed, the document presser plate 43 covers the contact glass 41 from above. The document presser plate 43 presses, from above, the document sheets set on the contact glass 41.

Figure 3:
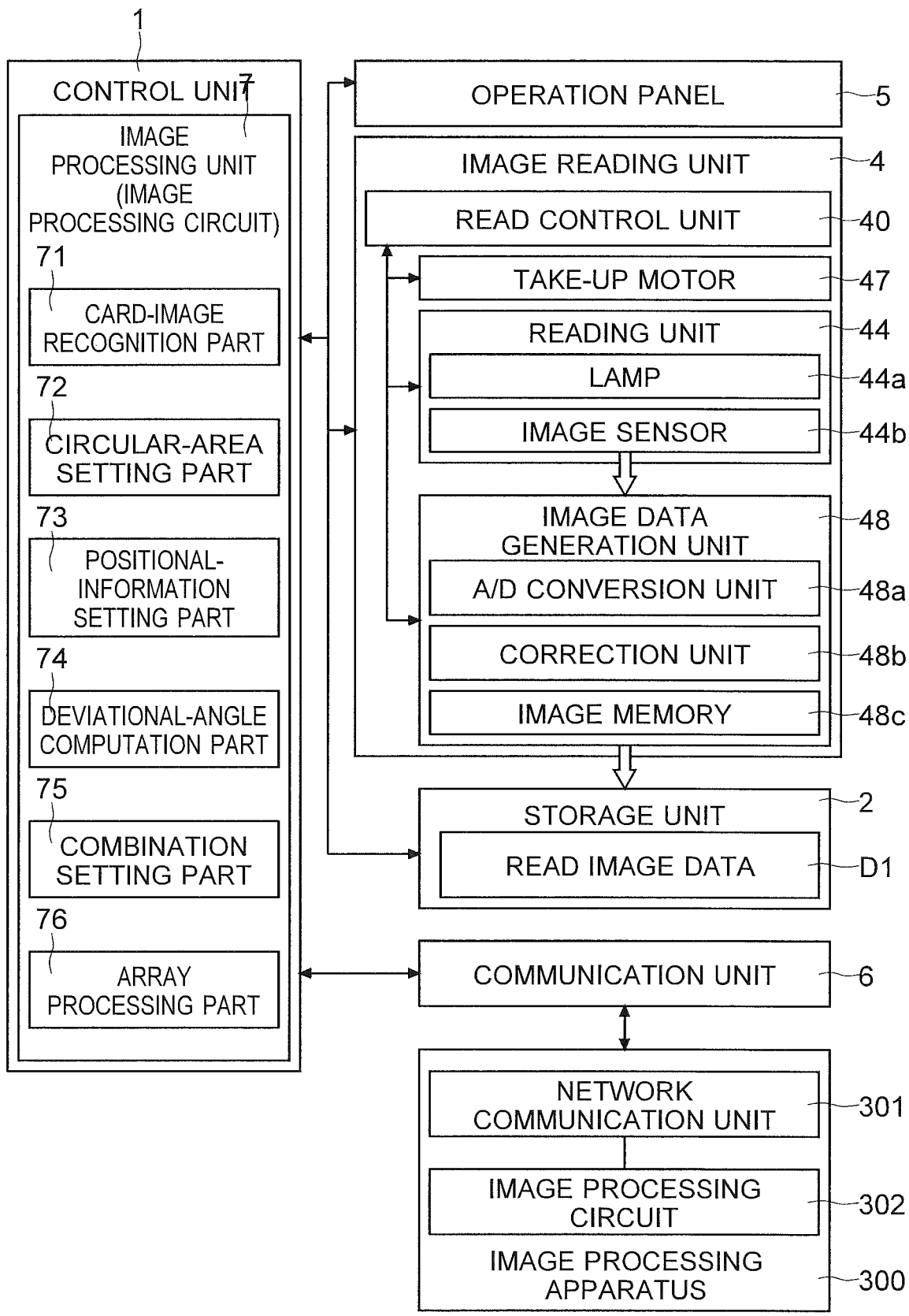
FIG. 3 is a view showing an example of the image reading unit according to the embodiment.

As shown in FIG. 3, the image reading unit 4 includes a read control part 40. The read control part 40 is a circuit board for controlling operations of the image reading unit 4. The read control part 40 includes a CPU, memory, and other circuits. The read control part 40 performs reading of document sheets upon reception of an instruction and a signal from the control unit 1.

As shown in FIG. 2, the image reading unit 4 includes a reading unit 44, a wire 45, and a take-up drum 46. The reading unit 44 is a scan unit of the CIS method. The wire 45 is connected to the reading unit 44 and the take-up drum 46. The take-up drum 46 is rotated by a take-up motor 47 (see FIG. 3) which rotates forward and reverse. In reading operation, the read control part 40 makes the take-up drum 46 rotated. By this rotation, the reading unit 44 is moved in a horizontal direction (sub-scanning direction, i.e., left/right direction of FIG. 2).

As shown in FIG. 3, the reading unit 44 includes a lamp 44a and an image sensor 44b. The lamp 44a illuminates a document with light. The image sensor 44b includes a plurality of light-receiving elements (pixels) arrayed in the main scanning direction. Each light-receiving element outputs an analog electric signal responsive to a reflected light quantity. The image reading unit 4 includes an image data generation unit 48. The image data generation unit 48 includes an A/D conversion unit 48a, a correction unit 48b, and an image memory 48c. The A/D conversion unit 48a corrects an analog signal of each light-receiving element of the image sensor 44b. The A/D conversion unit 48a converts a corrected analog signal of each light-receiving element into a digital value (e.g., 8-bit or 10-bit value). As a result, read image data D1 is generated. The correction unit 48b corrects the read image data D1. The correction unit 48b performs image processing for correcting density distortions of images due to reading process. For example, the correction unit 48b performs shading correction. Image data of individual lines generated by the image data generation unit 48 are accumulated in the image memory 48c. Thus, the image reading unit 4 generates read image data D1 based on document reading. The image data (read image data D1) accumulated in the image memory 48c is transmitted to the storage unit 2.

(Reading Mode)

Next, an example of document reading mode provided on the multifunction peripheral 200 according to this embodiment will be described with reference to FIG. 3. The image reading unit 4 reads document sheets set on the contact glass 41. The image reading unit 4 generates read image data D1. The multifunction peripheral 200 is enabled to perform printing based on the read image data D1 (copy job). The multifunction peripheral 200 is also enabled to transmit the read image data D1 (scan transmission job). The multifunction peripheral 200 is further enabled to store the read image data D1 in the storage unit 2 in a nonvolatile fashion (scan storage job). Output modes for the read image data D1 include printing, transmission and storage. Which is to be performed among printing, transmission and storage (which job is to be done) can be set by the operation panel 5.

As to modes for document reading, the multifunction peripheral 200 has a normal mode, a card-document one-side reading mode, and a card-document double-side reading mode. The touch panel 52 accepts an operation for selecting a mode. Based on an output of the touch panel 52, the control unit 1 recognizes the selected mode. The control unit 1 performs processing responsive to the selected mode.

The card-document one-side reading mode and the card-document double-side reading mode are modes for reading card-like document sheets. The card-document one-side reading mode is a mode for reading only one side of card-like document sheets. The card-document double-side reading mode is a mode for reading both sides of the card-like document sheets. In the card-document one-side reading mode and the card-document double-side reading mode, the image processing unit 7 performs image processing for card-like document sheets. Thus, the image processing unit 7 generates arrayed image data D2 in which card images 8 are disposed in array.

The image processing unit 7 (control unit 1, multifunction peripheral 200) includes parts for performing image processing associated with the individual card-like document reading modes, such as a card-image recognition part 71, a circular-area setting part 72, a positional-information setting part 73, a deviational-angle computation part 74, a combination setting part 75, and an array processing part 76 (see FIG. 3). The card-image recognition part 71, the circular-area setting part 72, the positional-information setting part 73, the deviational-angle computation part 74, and the array processing part 76 may be provided as circuits (hardware). Further, the card-image recognition part 71, the circular-area setting part 72, the positional-information setting part 73, the deviational-angle computation part 74, and the array processing part 76 may be implemented in a software fashion by means of processing circuits and image-processing programs of the image processing unit 7.

The normal mode is a mode in which document sheets are read on a sheet-by-sheet basis. When the document sheets are larger in size than a certain level, the document sheets are set page by page on the contact glass 41. In the normal mode, the image reading unit 4 reads one sheet of the set document on a page-by-page basis. For example, the control unit 1 instructs the image reading unit 4 to read an A4-size sheet of the set document on the page-by-page basis. In the normal mode, the image processing unit 7 does not perform image processing for card-like document sheets.

(Card-Document One-Side Reading Mode)

Figure 4:
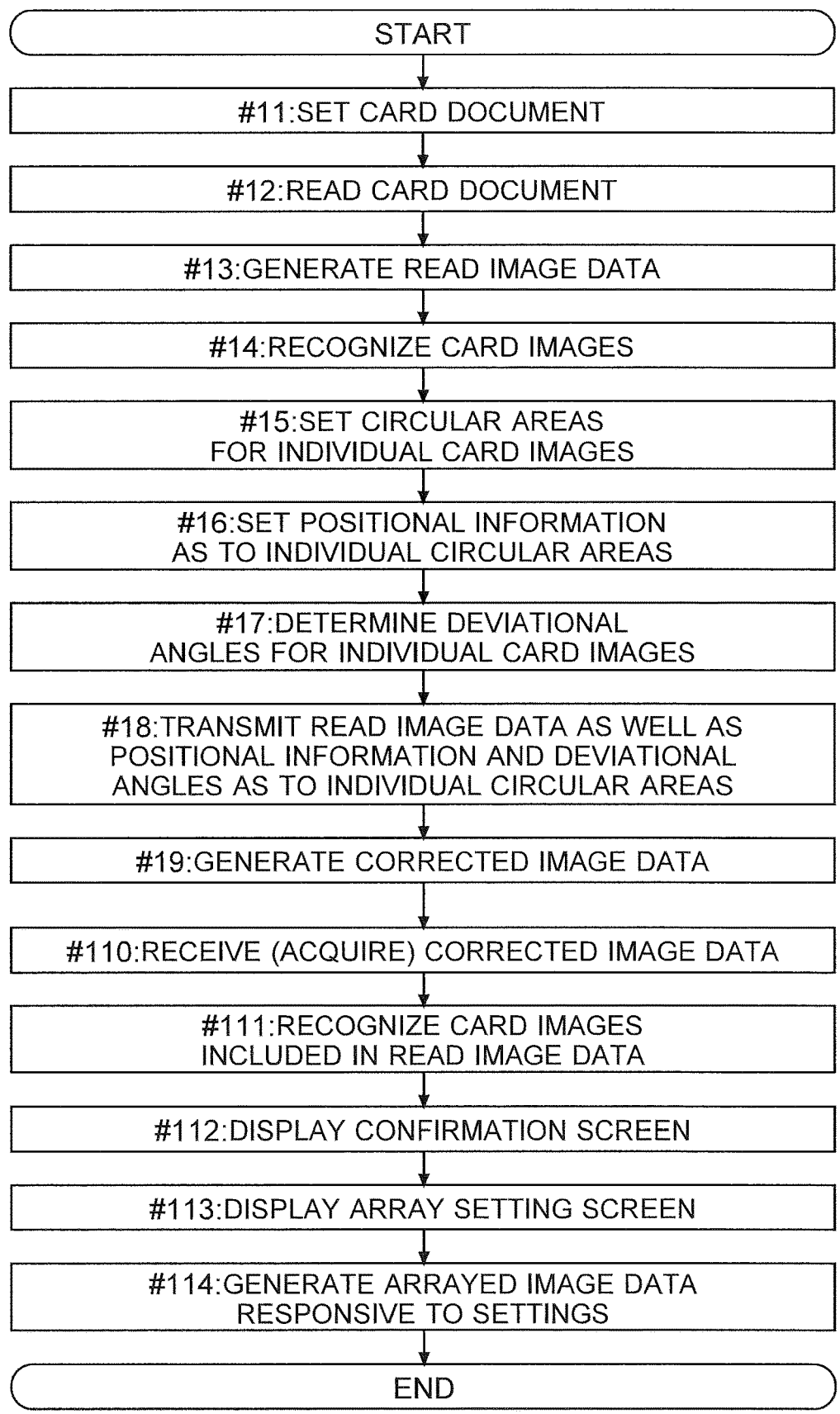
FIG. 4 is a flowchart showing an example of a processing flow in a card-document one-side reading mode according to the embodiment.

Next, an example of the card-document one-side reading mode according to this embodiment will be described with reference to FIGS. 3 to 11. A start of FIG. 4 is a time point when the card-document one-side reading mode is selected. First, a plurality of card-like document sheets are set on the contact glass 41 by a user (Step #11). For example, the user sets business cards. The card-like document sheets are so oriented that their one side to be read for the user's need is set down. After completion of the setting, the user lowers the document presser part 42.

Figure 5:
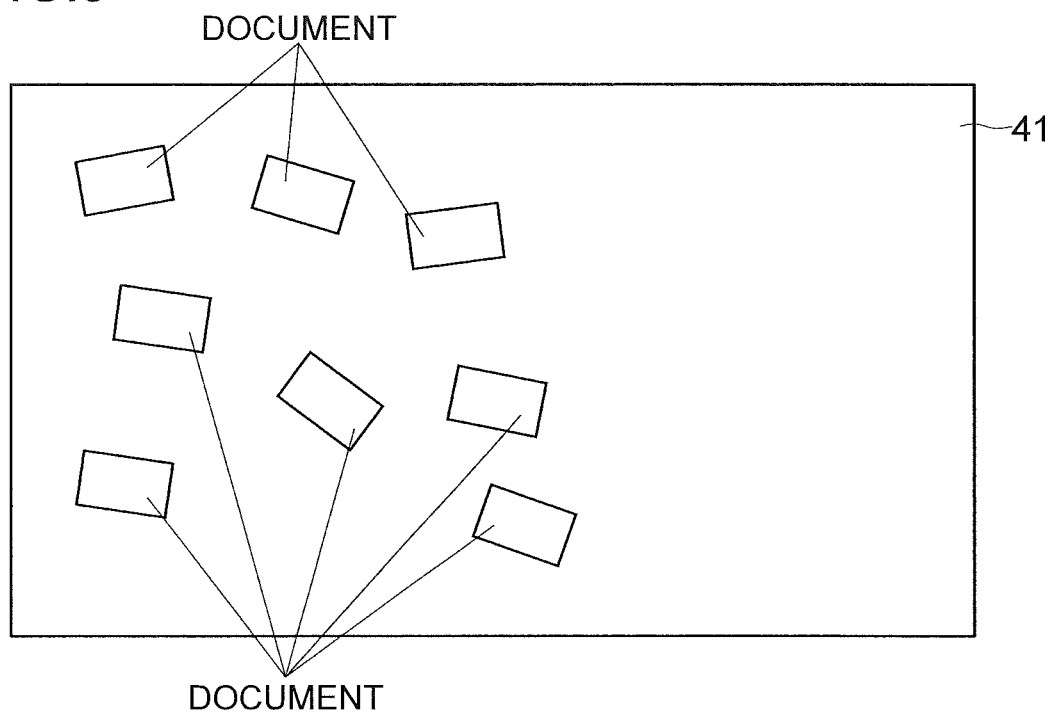
FIG. 5 is a view showing an example of a card-like document setting state according to the embodiment.

FIG. 5 is an example of a view of the contact glass 41 as viewed from above. Components or parts other than the contact glass 41 and the card-like document sheets are omitted in FIG. 5. FIG. 5 shows a state in which a plurality of card-like document sheets are set on the contact glass 41. The card-like document sheets are depicted by rectangular form in FIG. 5 (totally eight document sheets). Image data of one sheet may include information as to a plurality of card-like document sheets. As shown in FIG. 5, it is unnecessary to regularly array the card-like document sheets. It is also unnecessary to equalize angles of the individual card-like document sheets.

Figure 6:
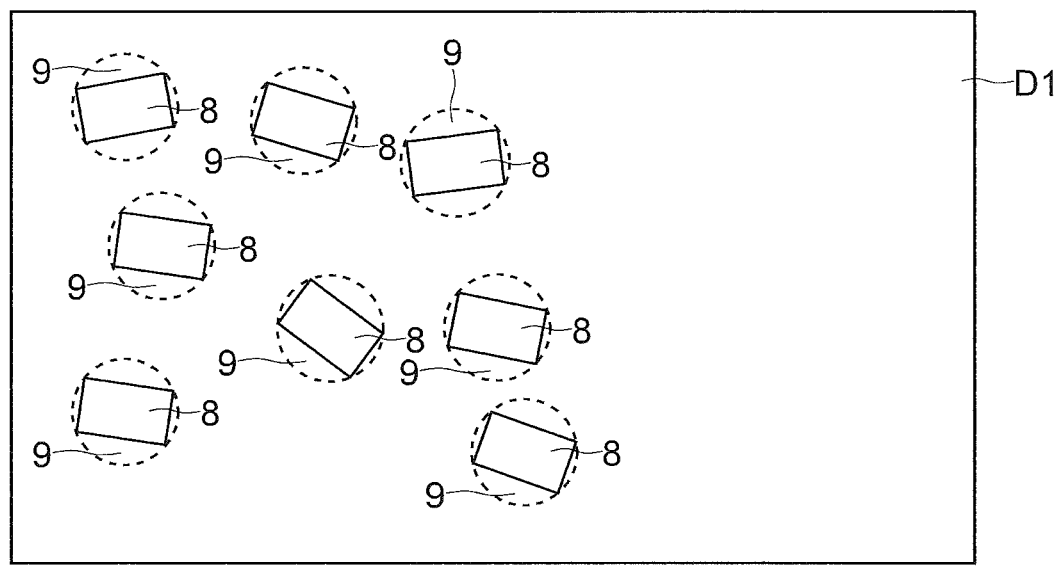
FIG. 6 is a view showing an example of read image data according to the embodiment.

Next, the control unit 1 instructs the image reading unit 4 to read a plurality of card-like document sheets (Step #12). In the card-document one-side reading mode, the control unit 1 may instruct the image reading unit 4 to read with a maximum readable range. The image reading unit 4 generates read image data D1 (Step #13). FIG. 6 shows an example of the read image data D1 obtained by reading after the setting of plural document sheets as in FIG. 5. FIG. 6 shows an example of the read image data D1 including plural rectangular-shaped card images 8.

The card-image recognition part 71 (image processing unit 7) recognizes the card images 8 included in the read image data D1 (Step #14). The card images 8 are parts of circular areas 9 (detailed later) corresponding to the card-like document sheets, respectively. In the case where the card-like document sheets are business cards, the card images 8 are images of business-card bodies, respectively.

A document sheet has thickness. Edge portions of a card-like document sheet irregularly reflect light derived from the lamp 44a. Pixels corresponding to the edge portions of a card-like document sheet are darkened in the read image data D1. The card-image recognition part 71 may recognize areas surrounded by high-density pixels (pixels higher in density than a predetermined reference value) as card images 8. Normally, business cards or ordinary cards are rectangular shaped. Therefore, the card-image recognition part 71 recognizes straight lines of high-density pixels in the read image data D1. The card-image recognition part 71 may recognize a frame composed of four straight lines and an area surrounded by the frame as a card image 8.

Figure 7:
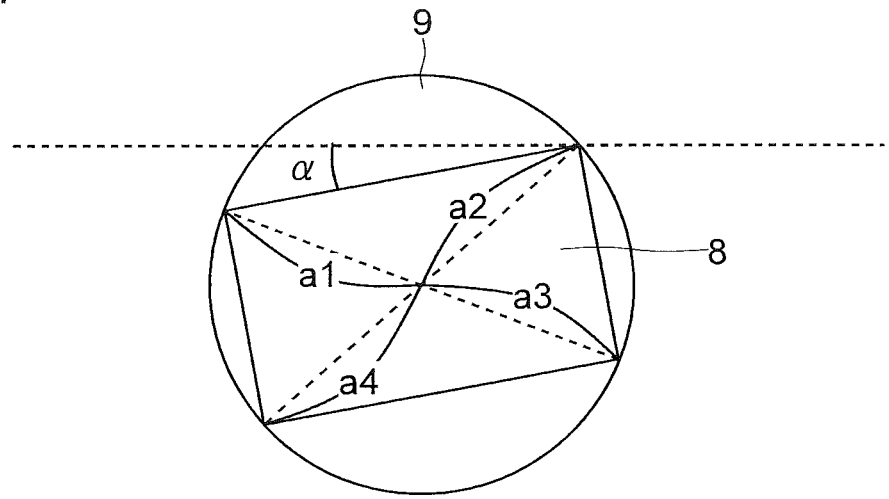
FIG. 7 is a view showing an example of setting of a circular area plus a deviational angle according to the embodiment.

Subsequently, the circular-area setting part 72 (image processing unit 7) sets circular areas 9 for the individual card images 8, respectively, such that each circular area 9 contains a whole card image 8 (Step #15). FIG. 6 shows, by broken line, an example of the circular areas 9 which are set with the read image data D1. Here is explained an example of setting for the circular areas 9 with reference to FIG. 7. With such card-like document sheets as business cards, the card images 8 are rectangular shaped. FIG. 7 depicts line segments a1, a2, a3, a4 which interconnect the intersecting point of diagonal lines of the rectangular shape (center of the rectangular shape) and corners of the rectangular shape, respectively. All of the line segments a1, a2, a3 and a4 are equal to one another as a property of the rectangular shape. A circle having a center at the intersecting point of the diagonal lines of the rectangular shape as well as a diameter coincident with each diagonal line of the rectangular shape contains the whole rectangular shape.

Under these conditions, the circular-area setting part 72 determines a center of each card image 8. Then, the circular-area setting part 72 makes the center of the card image 8 and the center of the circular area 9 concurrent with each other. The circular-area setting part 72 sets, as the circular area 9, a circle having a diameter represented by each diagonal line of the card image 8. By doing so, a circle that is the smallest one containing the card image 8 can be set as the circular area 9. In addition, the circular area 9 may also be set by other techniques.

Next, the positional-information setting part 73 (image processing unit 7) sets positional information as to individual circular areas 9 (Step #16). The positional information represents positions (ranges) of the circular areas 9 within the read image data D1. The positional information can be regarded also as information representing coordinates of pixels contained in the circular areas 9.

Further, the deviational-angle computation part 74 (image processing unit 7) determines a deviational angle for each circular area 9 (for each card image 8) (Step #17). The deviational angle represents an inclination of a card image 8 within the circular area 9 relative to a predetermined direction. The predetermined direction is given by the sub-scanning direction or the main scanning direction. In other words, the predetermined direction is the lateral direction or longitudinal direction of the read image data D1.

An example of computation of the deviational angle will be described with reference to FIG. 7. In the example described with FIG. 7, the predetermined direction is set to the sub-scanning direction (lateral direction of the read image data D1). Also in FIG. 7, a line along the sub-scanning direction is depicted by broken line. The line along the sub-scanning direction is depicted so as to overlap with the upper right corner of the card image 8.

The deviational-angle computation part 74 determines, as a deviational angle, an angle formed by the line along the predetermined direction and a longer side line (lengthwise straight line) of the card image 8 contained in the circular area 9. For example, a counterclockwise inclination (inclination with the upper right corner positioned upward) is assumed as a positive inclination, and a clockwise inclination (inclination with the upper right corner positioned downward) is assumed as a negative inclination. In this case, the deviational-angle computation part 74 determines a deviational angle as +α in FIG. 7.

The control unit 1 instructs the communication unit 6 to transmit the read image data D1 as well as positional information and deviational angles as to the circular areas 9, respectively, to the image processing apparatus 300 (Step #18). This is because the image processing unit 7 of the multifunction peripheral 200 has a limitation in terms of an angle to which image data can be turned.

The image processing unit 7 is enabled to turn image data. However, the turnable angle with image data is limited. The image processing unit 7 can turn image data only to an angle necessary for execution of jobs. For example, in intensive printing such as 2-in-1 printing, 90-degree turns may be needed. Also in double-side printing, 180-degree turns may be needed. Therefore, the image processing unit 7 is enabled to turn image data by 90 degrees and 180 degrees as an example. However, the image processing unit 7 has no function (hardware and software) of turning image data by any angle such as several degrees, ten odd degrees, and several tens degrees responsive to deviational angles.

Accordingly, in the image reading system 100, the image processing apparatus 300 is assigned to perform the turning processing of each circular area 9. The image processing apparatus 300 includes a network communication unit 301 for performing communications with the multifunction peripheral 200 (see FIG. 3). The image processing apparatus 300 also includes an image processing circuit 302 for performing turning processing (see FIG. 3). The image processing circuit 302 is less limited in turnable angle for image data than the image processing unit 7. For example, the image processing circuit 302 is enabled to turn image data in 1-degree or 0.1-degree steps.

The image processing apparatus 300 generates corrected image data based on positional information and deviational angles (Step #19). Based on received positional information, the image processing apparatus 300 recognizes individual circular areas 9 within the received read image data D1. Based on received deviational angles of the individual circular areas 9, the image processing apparatus 300 turns the circular areas 9. The image processing apparatus 300 turns each circular area 9 so that its deviational angle becomes zero. For example, the image processing apparatus 300 turns each circular area 9 clockwise or counterclockwise so that an angle formed by a longer side line of the card image 8 and the sub-scanning direction becomes zero degrees. As a result of this, corrected image data in which deviational angles of the individual card images 8 have been corrected can be obtained.

The image processing apparatus 300 transmits corrected image data toward the communication unit 6. The communication unit 6 of the multifunction peripheral 200 receives the corrected image data (Step #110). The communication unit 6 acquires the corrected image data. The card-image recognition part 71 (image processing unit 7) recognizes card images 8 included in the corrected image data (Step #111). The individual circular areas 9 are unchanged in position. Therefore, the card-image recognition part 71 (image processing unit 7) recognizes the individual circular areas 9 based on the positional information. Then, the card-image recognition part 71 recognizes card images 8 within the recognized circular areas 9, respectively. Their inclinations (deviational angles) have been corrected. Therefore, the card-image recognition part 71 recognizes, as card images 8 having their deviational inclinations corrected, areas each of which is surrounded by two straight lines of high-density pixels along the sub-scanning direction as well as two straight lines of high-density pixels along the main scanning direction within the circular areas 9, respectively.

Figure 8:
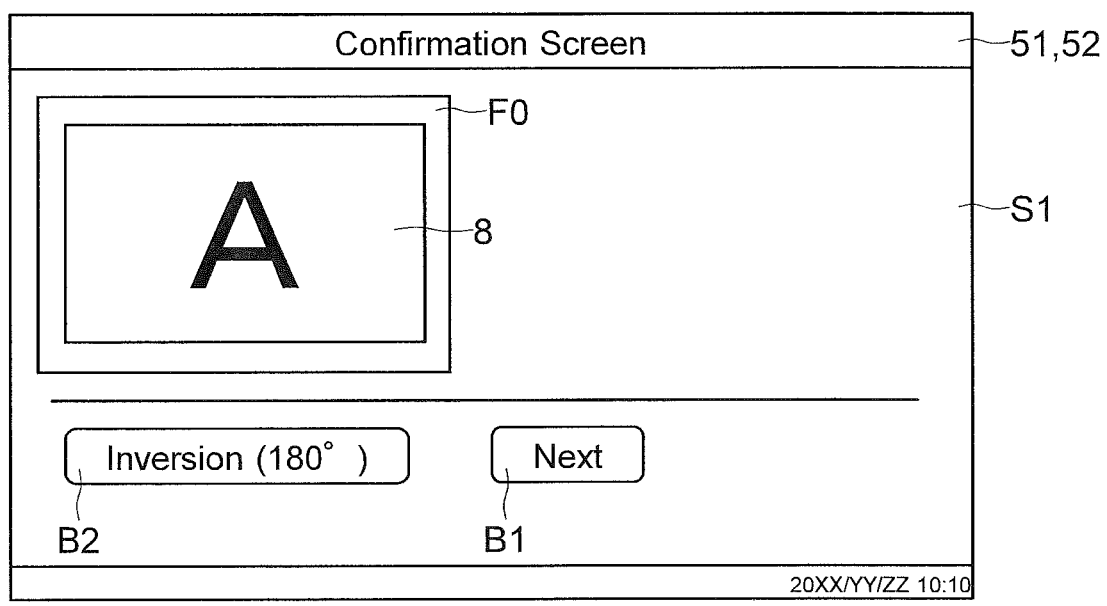
FIG. 8 is a view showing an example of a confirmation screen according to the embodiment.
Figure 9:
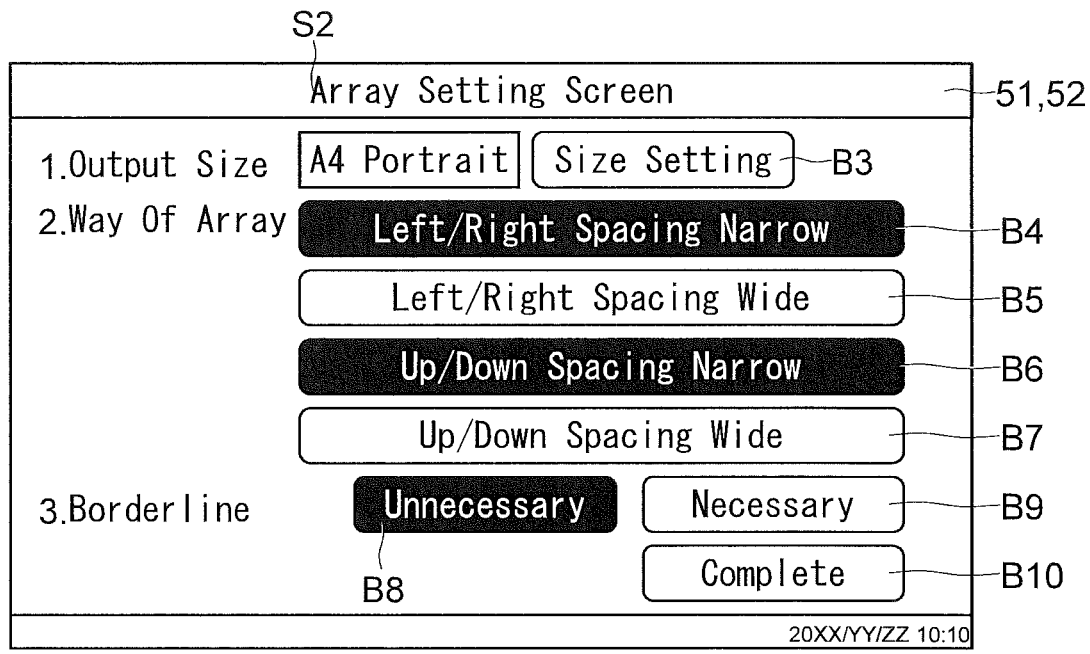
FIG. 9 is a view showing an example of an array setting screen according to the embodiment.

Then, the control unit 1 instructs the display panel 51 to display a confirmation screen S1 (Step #112). FIG. 8 shows an example of the confirmation screen S1 in the card-document one-side reading mode. A card-image display area F0 is provided in the confirmation screen S1. The control unit 1 displays, in the card-image display area F0, one card image 8 out of the card images 8 that are included in the corrected image data and that have been corrected in deviational inclination. When a pixel count of the card-image display area F0 is smaller than a pixel count of the card image 8, the image processing unit 7 generates a scaled-down image of the card image 8. In this case, the control unit 1 makes the card image 8 displayed based on the scaled-down image.

The card-image recognition part 71 (image processing unit 7) sets a sequential order of the respective card images 8 in the corrected image data. For example, the card-image recognition part 71 assigns sequential numbers to the card images 8, respectively, in the corrected image data in an order from upper to lower side. When the confirmation screen S1 is first displayed, the control unit 1 instructs the display panel 51 to display the first card image 8.

The control unit 1 makes a Next button B1 displayed in the confirmation screen S1. When the Next button B1 is operated, the control unit 1 instructs the display panel 51 to display a next-numbered card image 8. The user confirms the card images 8, which have been corrected in deviational inclination, one by one up to the last sequential number.

The control unit 1 makes an INVERSION button B2 displayed in the confirmation screen S1. The INVERSION button B2 is a button for inverting a card image 8 displayed in the card-image display area F0. Even with upside down, the card image 8 can be corrected on the confirmation screen S1. In addition, information representing the card image 8 for which the INVERSION button B2 has been operated is stored in the storage unit 2.

When the Next button B1 is operated with the last-numbered card image 8 displayed, the control unit 1 instructs the display panel 51 to display an array setting screen S2 (Step #113). Provided in the array setting screen S2 are a SIZE SETTING button B3, a first left/right spacing button B4, a second left/right spacing button B5, a first up/down spacing button B6, a second up/down spacing button B7, an UNNECESSARY button B8, a NECESSARY button B9, and a COMPLETE button B10.

The array setting screen S2 makes it possible to set a size of image data (arrayed image data D2) in which the card images 8 are arrayed. When the SIZE SETTING button B3 is operated, the control unit 1 instructs the display panel 51 to display a size select screen (not shown) for selectable sizes of image data. The user selects an output size on this screen. Based on outputs of the touch panel 52 and the hard keys 53, the control unit 1 recognizes the selected output size.

The first left/right spacing button B4 and the second left/right spacing button B5 are buttons for setting a left/right spacing between the card images 8 in the arrayed image data D2. In response to an operated left/right spacing button, the left/right spacing of the card images 8 in the arrayed image data D2 is changed in width. The first up/down spacing button B6 and the second up/down spacing button B7 are buttons for setting an up/down spacing of the card images 8 in the image data (arrayed image data D2) in which the card images 8 are arrayed. In response to an operated up/down spacing button, the up/down spacing of the card images 8 in the arrayed image data D2 is changed in width. The UNNECESSARY button B8 and the NECESSARY button B9 are buttons for setting whether or not borderlines are included in the arrayed image data D2. The COMPLETE button B10 is a button for completing the setting on the array setting screen S2.

As described above, the touch panel 52 and the hard keys 53 accept setting operations by the user in the confirmation screen 51 and the array setting screen S2. The control unit 1 recognizes setting contents based on outputs of the touch panel 52 and the hard keys 53.

When the COMPLETE button B10 is operated, the array processing part 76 (image processing unit 7) generates arrayed image data D2 responsive to the settings (Step #114). The generated arrayed image data D2 are stored in the storage unit 2 (see FIG. 1). The stored arrayed image data D2 are usable for print jobs and transmission jobs. Thus, this flow is terminated (END).

The arrayed image data D2 are image data in which card images 8 corrected in deviational inclination are arrayed based on the corrected image data. The array processing part 76 extracts the deviational inclination-corrected card images 8 from the corrected image data. Then, the array processing part 76 arrays the extracted card images 8 in a non-overlapping fashion.

The array processing part 76 generates arrayed image data D2 responsive to setting operations on the confirmation screen S1 and the array setting screen S2. The array processing part 76 generates arrayed image data D2 of a selected output size. With the A4 size selected, the array processing part 76 generates arrayed image data D2 of the A4 size.

The array processing part 76 recognizes card images 8 for which the INVERSION button B2 has been operated. With respect to the card images 8 for which the INVERSION button B2 has been operated, the array processing part 76 makes inverted (180°-turned) card images 8 included in the arrayed image data D2. When the first left/right spacing button B4 operated, the array processing part 76 sets the left/right spacing of card images 8 to a first spacing. When the second left/right spacing button B5 is operated, the array processing part 76 sets the left/right spacing of card images 8 to a second spacing. The first spacing is narrower than the second spacing. The first spacing and the second spacing may be determined previously.

When the first up/down spacing button B6 is operated, the array processing part 76 sets the up/down spacing of card images 8 to a third spacing. When the second up/down spacing button B7 is operated, the array processing part 76 sets the up/down spacing of card images 8 to a fourth spacing. The third spacing is narrower than the fourth spacing. The third spacing and the fourth spacing may be determined previously.

When the UNNECESSARY button B8 is operated, the array processing part 76 generates arrayed image data D2 including no borderline between one card image 8 and another card image 8. When the NECESSARY button B9 is operated, the array processing part 76 generates arrayed image data D2 including a borderline between one card image 8 and another card image 8. The borderline is a broken line as an example.

Figure 10:
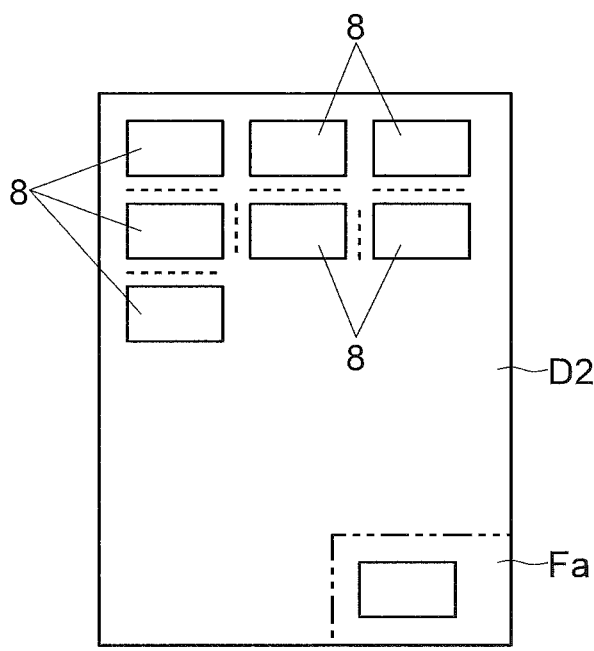
FIG. 10 is a view showing an example of arrayed image data according to the embodiment.
Figure 11:
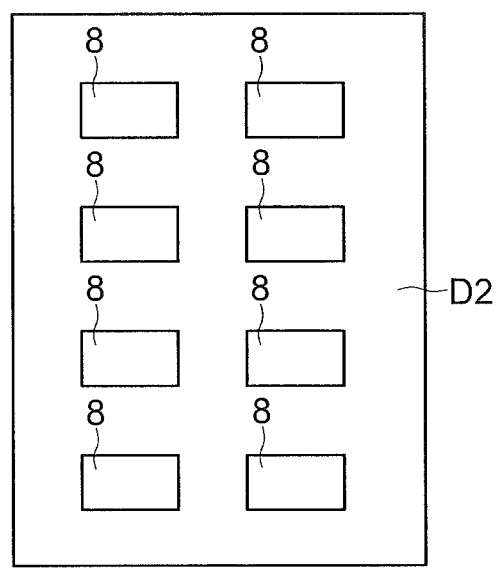
FIG. 11 is a view showing an example of arrayed image data according to the embodiment.

FIGS. 10 and 11 are views each showing an example of the arrayed image data D2 in the card-document one-side reading mode according to this embodiment. Card images 8 corrected in deviational inclination are used based on corrected image data. Therefore, all of the card images 8 are equalized in angle.

FIG. 10 shows an example of the arrayed image data D2 generated when the first left/right spacing button B4, the first up/down spacing button B6 and the NECESSARY button B9 are operated. As shown in FIG. 10, when the NECESSARY button B9 is operated, the array processing part 76 adds a borderline between one card image 8 and another card image 8. When the first left/right spacing button B4 is operated, the array processing part 76 sets the left/right spacing between one card image 8 and another card image 8 to the first spacing, as shown in FIG. 10. Also, when the first up/down spacing button B6 is operated, the array processing part 76 sets the up/down spacing between one card image 8 and another card image 8 to the third spacing.

In addition, when the first left/right spacing button B4 is operated, the array processing part 76 may set the spacing between a left end of one card image 8 located on the leftmost place and a left end of the arrayed image data D2 to the first spacing (see FIG. 10). When the first up/down spacing button B6 is operated, the array processing part 76 may also set the spacing between an upper edge of the uppermost-placed card image 8 and an upper end of the arrayed image data D2 to the third spacing.

FIG. 11 shows an example of arrayed image data D2 generated when the second left/right spacing button B5, the second up/down spacing button B7 and the UNNECESSARY button B8 are operated. As shown in FIG. 11, when the UNNECESSARY button B8 is operated, the array processing part 76 adds no borderline between one card image 8 and another card image 8. When the second left/right spacing button B5 is operated, the array processing part 76 sets the left/right spacing between one card image 8 and another card image 8 to the second spacing. Also, when the second up/down spacing button B7 is operated, the array processing part 76 sets the up/down spacing between one card image 8 and another card image 8 to the fourth spacing.

In addition, when the second left/right spacing button B5 is operated, the array processing part 76 may set a spacing between a left end of one card image 8 located on the leftmost place and a left end of the arrayed image data D2 to the second spacing (see FIG. 11). When the second up/down spacing button B7 is operated, the array processing part 76 may also set a spacing between the upper edge of the uppermost-placed card image 8 and the upper end of the arrayed image data D2 to the fourth spacing.

The array processing part 76 (image processing unit 7) may decide whether low-density card images 8 are included. In this case, the array processing part 76 decides that out of the card images 8, a card image 8 of which a pixel-value average of pixels within its frame lines is lower than a predetermined threshold value is a low-density card image 8. Also, the array processing part 76 decides that out of the card images 8, a card image 8 of which a pixel-value average of pixels within the frame lines is equal to or higher than the predetermined threshold value is not a low-density card image 8. Card images 8 decided as low density may be due to improper documents. Therefore, the array processing part 76 may locate a card image 8 decided as low density within a predetermined specific area Fa in the arrayed image data D2. FIG. 10 depicts one example of the specific area Fa. For example, the specific area Fa may be a lower corner section of the arrayed image data D2. The position of the specific area Fa is not particularly limited.

(Card-Document Double-Side Reading Mode)

Next, an example of the card-document double-side reading mode according to this embodiment will be described with reference to FIGS. 12 to 19. In the card-document double-side reading mode, one side of card-like document sheets is read. Thereafter, the other side of the card-like document sheets is read. In other words, Steps #11 to #111 in FIG. 4 are executed with respect to one side of the card-like document sheets. Steps #11 to #111 in FIG. 4 are executed also with respect to the other side of the card-like document sheets.

Figure 12:
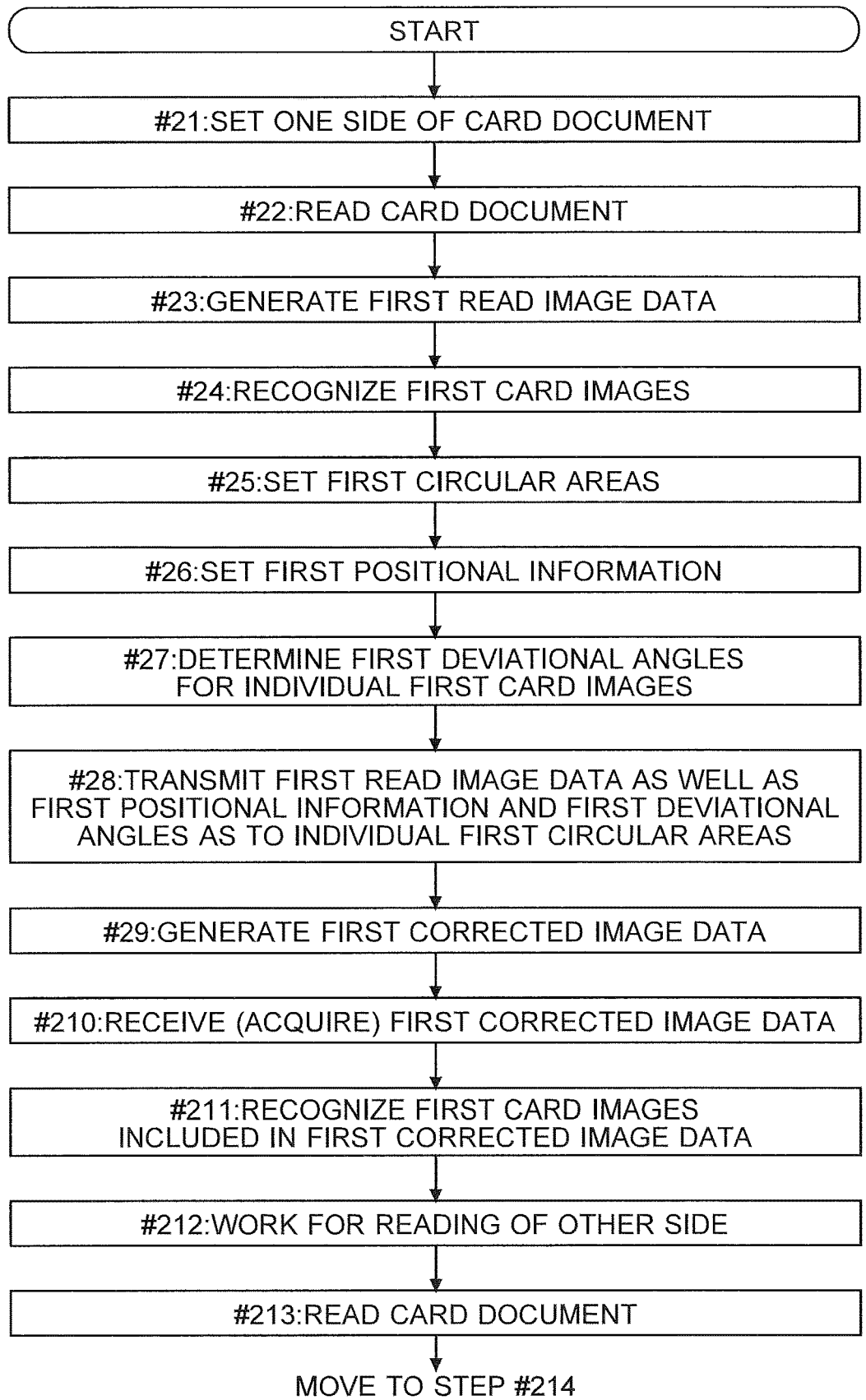
FIG. 12 is a flowchart showing an example of a processing flow in a card-document double-side reading mode according to the embodiment.
Figure 13:
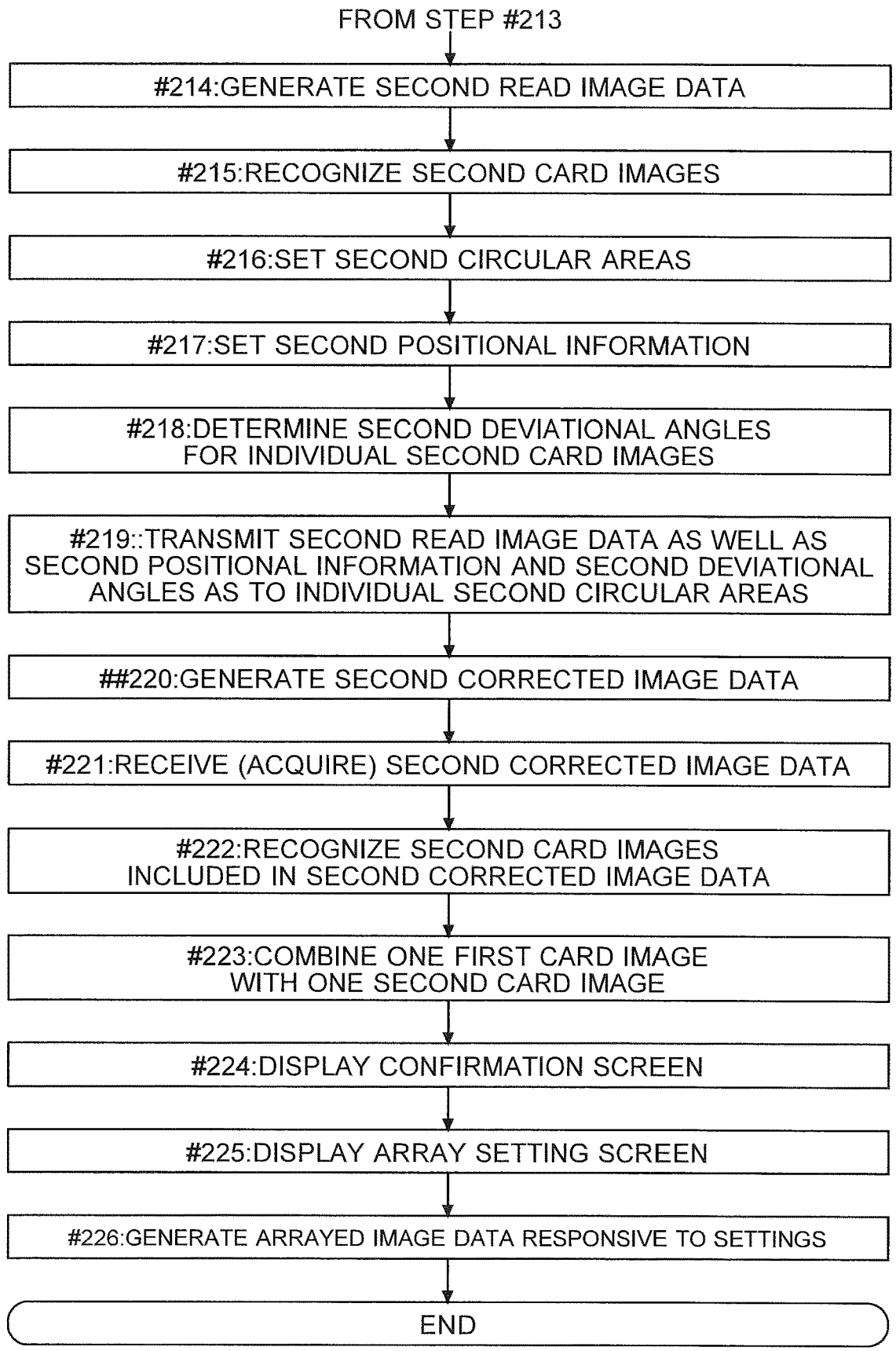
FIG. 13 is a flowchart showing an example of the processing flow in the card-document double-side reading mode according to the embodiment.

A start of FIG. 12 is a time point at which the card-document double-side reading mode is selected. First, a user sets card-like document sheets on the contact glass 41 (Step #21). In this case, the card-like document sheets are set with their one side down. After completion of the setting, the user lowers the document presser part 42. Next, the control unit 1 instructs the image reading unit 4 to read a plurality of card-like document sheets (Step #22). As a result, one side of the plural card-like document sheets is read. The image reading unit 4 generates first read image data as read image data a1 (Step #23). The first read image data includes card images 8 of the one side of the card-like document sheets.

The card-image recognition part 71 (image processing unit 7) recognizes card images 8 (first card images 81) included in the first read image data (Step #24). The method of recognition for the first card images 81 is the same as in the above-described Step #14.

Subsequently, the circular-area setting part 72 (image processing unit 7) sets circular areas 9 (first circular areas 91) for the first card images 81, respectively, such that each circular area 9 contains a whole first card image 81 (Step #25). The setting method for the first circular areas 91 is the same as in the above-described Step #15. Next, the positional-information setting part 73 (image processing unit 7) sets positional information (first positional information) as to the individual first circular areas 91 (Step #26). The first positional information represents positions (coordinates) of the individual first circular areas 91 within the first read image data.

Further, the deviational-angle computation part 74 (image processing unit 7) determines a first deviational angle for each first circular area 91 (Step #27). The first deviational angle represents an inclination of a first card image 81 within the first circular area 91 relative to a predetermined direction. The predetermined direction is given by the sub-scanning direction or the main scanning direction. The method of determination for the first deviational angle is the same as in the above-described Step #17. The control unit 1 instructs the communication unit 6 to transmit the first read image data, as well as the first positional information and the first deviational angles as to the individual first circular areas 91, toward the image processing apparatus 300 (Step #28).

The image processing apparatus 300 generates first corrected image data based on the first positional information and the first deviational angles (Step #29). The image processing apparatus 300 makes each first circular area 91 turned so that its deviational angle becomes zero. The method of generation for the corrected image data is the same as in the above-described Step #19. The image processing apparatus 300 transmits the first corrected image data toward the communication unit 6. The communication unit 6 of the multifunction peripheral 200 receives the first corrected image data (Step #210). The communication unit 6 acquires the first corrected image data. The card-image recognition part 71 (image processing unit 7) recognizes the first card images 81 included in the first corrected image data (Step #211). The method of recognition for the first card images 81 is the same as in Step #111.

Then, work for reading of the other side by the user is carried out (Step #212). First, the user raises the document presser part 42. Then, the user turns over the individual card-like document sheets placed on the contact glass 41. There is no need for realigning the card-like document sheets. The card-like document sheets have only to be turned over in the same positions. The card-like document sheets are set again so that the other side goes down. As a result, setting of the other side of the card-like document sheets is completed. After completion of the setting, the user lowers the document presser part 42.

Next, the control unit 1 instructs the image reading unit 4 to read a plurality of card-like document sheets (Step #213). As a result, the other side of the plural card-like document sheets is read. The image reading unit 4 generates second read image data as read image data D1 (Step #214). The second read image data include card images 8 corresponding to the other side of the card-like document sheets. The card-image recognition part 71 (image processing unit 7) recognizes the card images 8 (second card images 82) included in the second read image data (Step #215). The method of recognition for the second card images 82 is the same as in the above-described. Step #14.

Subsequently, the circular-area setting part 72 (image processing unit 7) sets circular areas 9 (second circular areas 92) for the individual second card images 82, respectively, such that each circular area 9 (second circular area 92) contains a whole second card image 82 (Step #216). The setting method for the second circular areas 92 is the same as in the above-described Step #15. Next, the positional-information setting part 73 (image processing unit 7) sets positional information (second positional information) as to individual second circular areas 92 (Step #217). The second positional information represents positions of the individual second circular areas 92 within the second read image data.

Further, the deviational-angle computation part 74 (image processing unit 7) determines a second deviational angle for each second circular area 92 (Step #218). The second deviational angle represents an inclination of a second card image 82 within the second circular area 92 relative to a predetermined direction. The predetermined direction is given by the sub-scanning direction or the main scanning direction. The method of determination for the second deviational angle is the same as in the above-described Step #17. The control unit 1 instructs the communication unit 6 to transmit the second read image data as well as second positional information and second deviational angles as to the second circular areas 92, respectively, toward the image processing apparatus 300 (Step #219).

The image processing apparatus 300 generates second corrected image data based on the second positional information and the second deviational angles (Step #220). The image processing apparatus 300 turns each second circular area 92 so that its deviational angle becomes zero. The generation method for the second corrected image data is the same as in the above-described Step #19. The image processing apparatus 300 transmits the second corrected image data toward the communication unit 6. The communication unit 6 of the multifunction peripheral 200 receives the second corrected image data (Step #221). The communication unit 6 acquires the second corrected image data. The card-image recognition part 71 (image processing unit 7) recognizes second card images 82 included in the second corrected image data (Step #222). The recognition method for the second card images 82 is the same as in Step #111.

Next, the combination setting part 75 (image processing unit 7) combines one first card image 81 with one of the second card images 82 (Step #223). Based on a positional overlap between the first circular area 91 and the second circular area 92, the combination setting part 75 combines a first card image 81 and a second card image 82 with each other.

Figure 14:
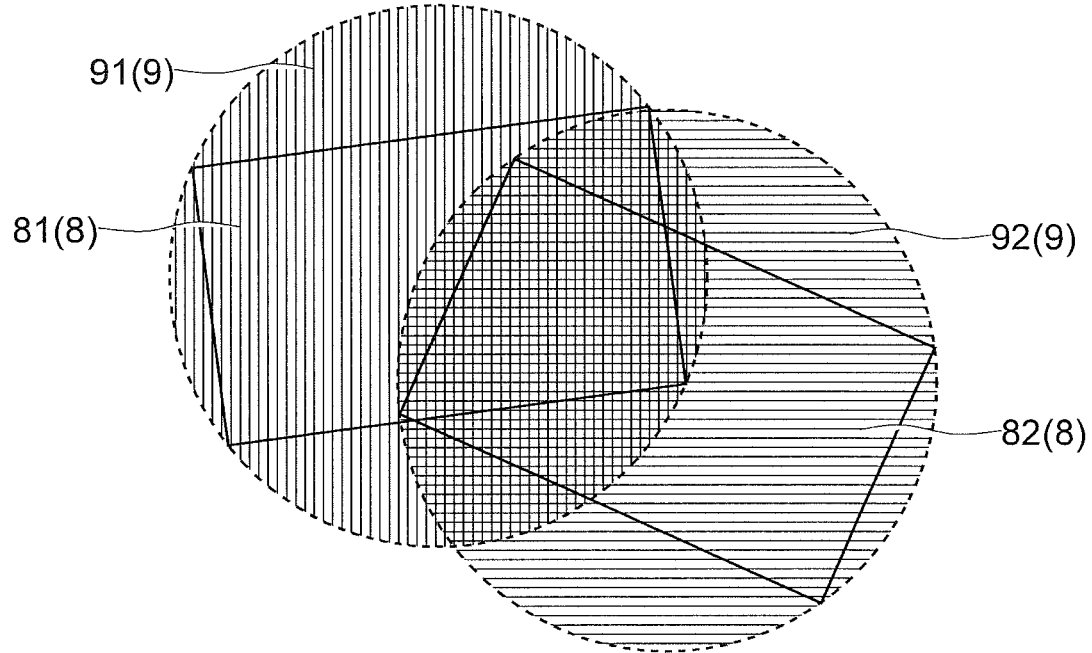
FIG. 14 is a view showing an example of a combining method of individual card images according to the embodiment.

The combination setting part 75 combines the first card image 81 and the second card image 82 both of an identical document sheet. In this case, when the other side of the card image 8 is read, the card-like document sheet on the contact glass 41 is turned over. Therefore, the card-like document sheet remains generally unchanged in position. FIG. 14 depicts an example of the first circular area 91 by vertical-line hatching. FIG. 14 also depicts an example of the second circular area 92 by horizontal-line hatching. Then, with regard to an identical card-like document sheet, as shown in FIG. 14, the first circular area 91 and the second circular area 92, in principle, partly overlap with each other.

Accordingly, the combination setting part 75 combines together the first card image 81 and the second card image 82 of the first circular area 91 and the second circular area 92, respectively, overlapping with each other. Images of top and back of an identical card-like document sheet are combined together automatically.

Figure 15:
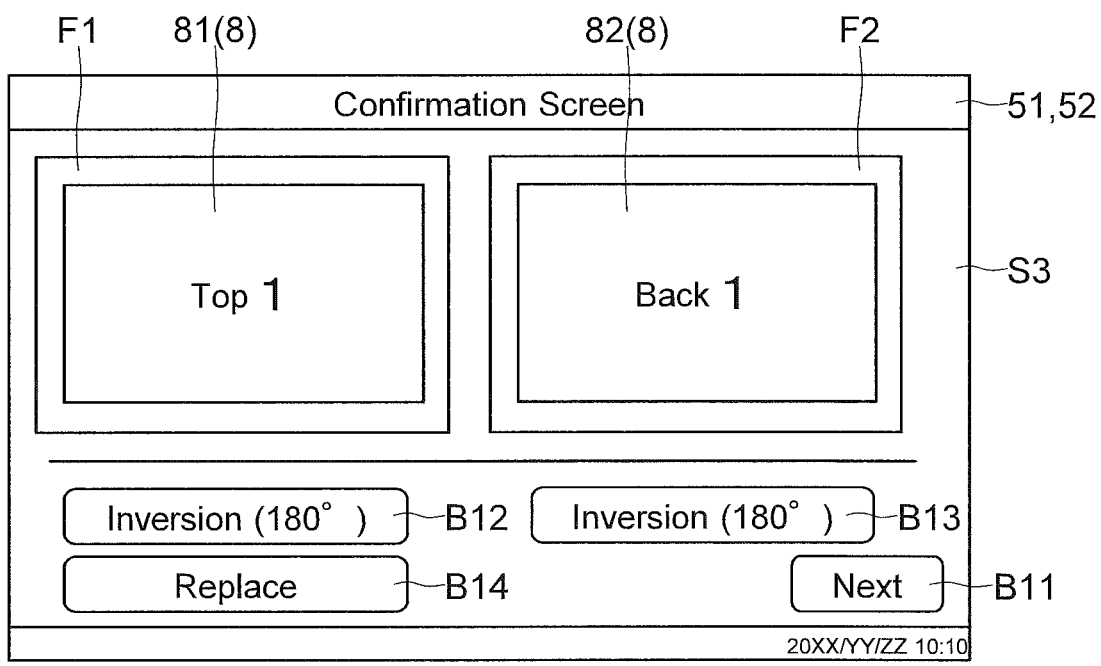
FIG. 15 is a view showing an example of the confirmation screen according to the embodiment.
Figure 16:
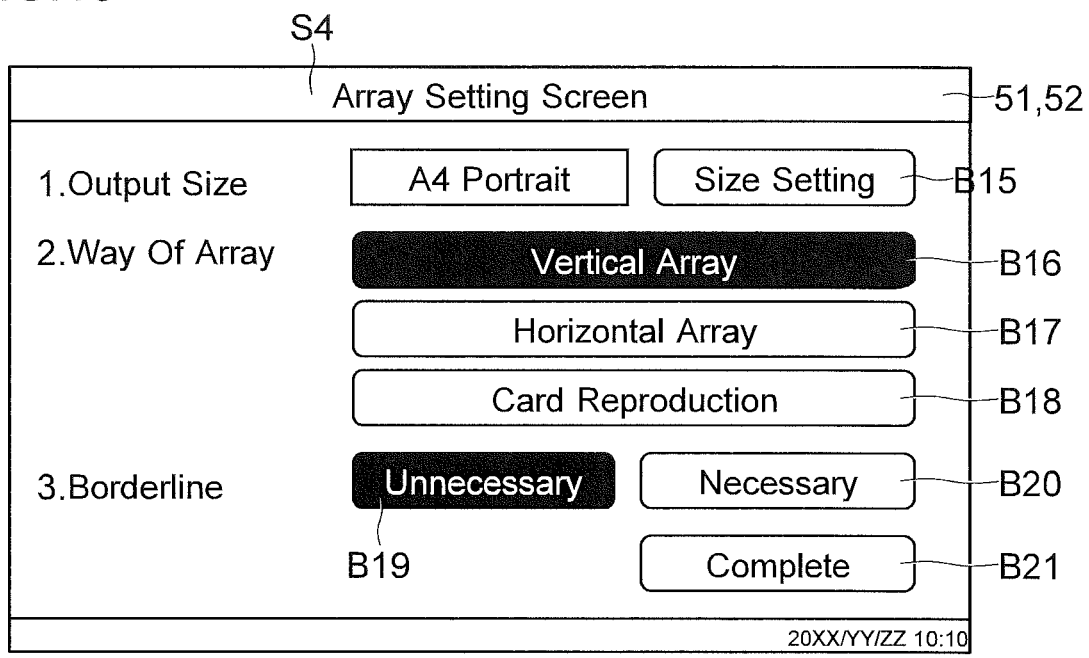
FIG. 16 is a view showing an example of the array setting screen according to the embodiment.

Next, the control unit 1 instructs the display panel 51 to display a confirmation screen S3 (Step #224). FIG. 15 shows an example of the confirmation screen S3 in the card-document double-side reading mode. A first display area F1 and a second display area F2 are provided in the confirmation screen S3. The control unit 1 displays, in the first display area F1, one first card image 81 out of the first card images 81 that are included in the first corrected image data and that have been corrected in deviation. The control unit 1 displays, in the second display area F2, a second card image 82 that has been combined with the displayed first card image 81. The image processing unit 7, as required, scales down the first card image 81 and the second card image 82 to generate a scaled-down image. In this case, the control unit 1 makes the card images 8 displayed in the individual areas, respectively, based on the scaled-down image.

The card-image recognition part 71 (image processing unit 7) sets a sequential order of the respective first card images 81 in the first corrected image data. For example, the card-image recognition part 71 assigns sequential numbers to the first card images 81, respectively, in the first corrected image data in an order from upper to lower side. When the confirmation screen S3 is first displayed, the control unit 1 instructs the display panel 51 to display the first-numbered first card image 8. Also, the control unit 1 instructs the display panel 51 to display a second card image 82 combined with the first-numbered first card image 81. The term 'TOP 1' in FIG. 15 refers to a first-numbered first card image 81. The term 'BACK 1' in FIG. 15 refers to a second card image 82 combined with the first-numbered first card image 81.

The control unit 1 makes a Next button B11 displayed in the confirmation screen S3. When the Next button B11 is operated, the control unit 1 instructs the display panel 51 to display a next-numbered first card image 81. Also, the control unit 1 instructs the display panel 51 to display a second card image 82 combined with the next-numbered first card image 81. The user repeats the operation with the Next button B11. The user confirms the first card images 81 and the second card image 82, which have been corrected, one by one up to the last sequential number.

The control unit 1 also makes a first INVERSION button B12 and a second INVERSION button B13 displayed in the confirmation screen S3. The first INVERSION button B12 is a button for inverting a first card image 81 displayed in the first display area F1. The second INVERSION button B13 is a button for inverting a second card image 82 displayed in the second display area F2. Even with upside down, a card image 8 can be corrected on the confirmation screen S3. Information representing card images 8 for which the inversion buttons have been operated is stored in the storage unit 2.

Also, the control unit 1 makes a REPLACE button B14 displayed in the confirmation screen S3. The REPLACE button B14 is a button for changing a second card image 82 to be combined with a displayed first card image 81. In other words, the touch panel 52 accepts a changing operation for changing a second card image 82 to be combined with a first card image 81.

For example, the card-image recognition part 71 (image processing unit 7) sets a sequential order of the respective second card images 82 in the second corrected image data. For example, the card-image recognition part 71 assigns sequential numbers to the second card images 82, respectively, in the second corrected image data in an order from upper to lower side. When a changing operation is performed, the combination setting part 75 changes a second card image 82 which is to be combined with a first card image 81 and for which the changing operation has been done. The combination setting part 75 newly combines the currently displayed first card image 81 with a second card image 82 numbered next to a currently combined second card image 82. When a combination change is executed, the control unit 1 instructs the display panel 51 to display the newly combined second card image 82 in the second display area F2. Thus, an incorrect combination, if any, can be corrected.

Given a possibility that the combination may be erroneous, the control unit 1 instructs the display panel 51 to make a display using a predetermined caution color. For example, the control unit 1 instructs a display by using the predetermined caution color for any one or both of the first card image 81 and the second card image 82. In this case, the image processing unit 7 (e.g., combination setting part 75) determines a ratio resulting from dividing an overlapping area between a first circular area 91 and a second circular area 92 by a total area of the first circular area 91. For a combination in which the determined ratio is equal to or less than a predetermined reference ratio, the control unit 1 instructs the display panel 51 to display the first card image 81 and/or the second card image 82 by using the caution color.

The reference ratio is determined as appropriate. For example, the reference ratio is 50%. The caution color is also determined as appropriate. For example, the caution color is pink. The caution color may be made settable by the touch panel 52 or the hard keys 53. For example, the control unit 1 instructs the display panel 51 to display a first card image 81 or a second card image 82 in which white-colored pixels are converted into the caution color.

When the Next button B11 is operated with the last-numbered first card image 81 displayed, the control unit 1 instructs the display panel 51 to display an array setting screen S4 (Step #225). Provided in the array setting screen S4 are a SIZE SETTING button B15, a VERTICAL ARRAY button B16, a HORIZONTAL ARRAY button B17, a CARD REPRODUCTION button B18, an UNNECESSARY button B19, a NECESSARY button B20, and a COMPLETE button B21.

A size of image data (arrayed image data D2) in which the first card images 81 and the second card images 82 are arrayed can be set by operating the SIZE SETTING button B15. When the SIZE SETTING button B15 is operated, the control unit 1 instructs the display panel 51 to display a size select screen (not shown) for selectable sizes of image data. The user selects an output size on this screen. Based on outputs of the touch panel 52 and the hard keys 53, the control unit 1 recognizes the selected output size.

Figure 17:
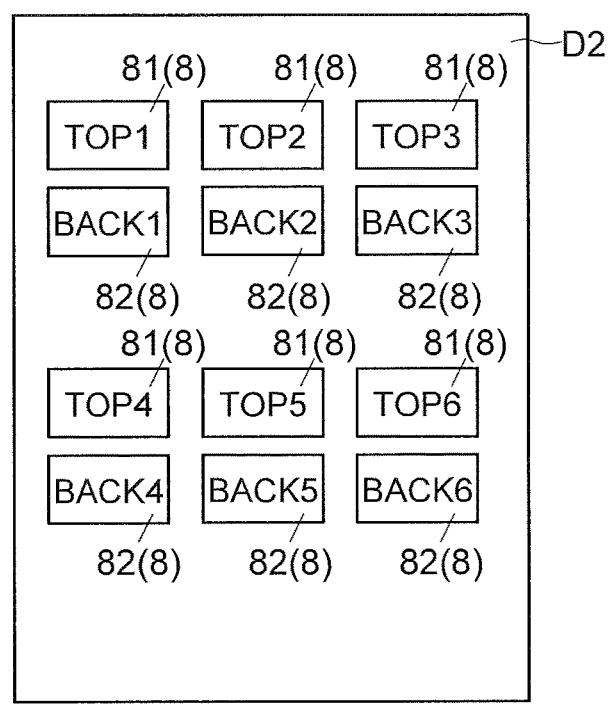
FIG. 17 is a view showing an example of arrayed image data according to the embodiment.

The VERTICAL ARRAY button B16, the HORIZONTAL ARRAY button B17, and the CARD REPRODUCTION button B18 are buttons for setting a way of array for the individual card images 8. When the VERTICAL ARRAY button B16 is operated, the array processing part 76 generates arrayed image data D2 in which a first card image 81 and a second card image 82 of each combination are arrayed in the vertical direction. FIG. 17 shows an example of the arrayed image data D2 in which a first card image 81 and a second card image 82 of each combination are arrayed in the vertical direction.

Figure 18:
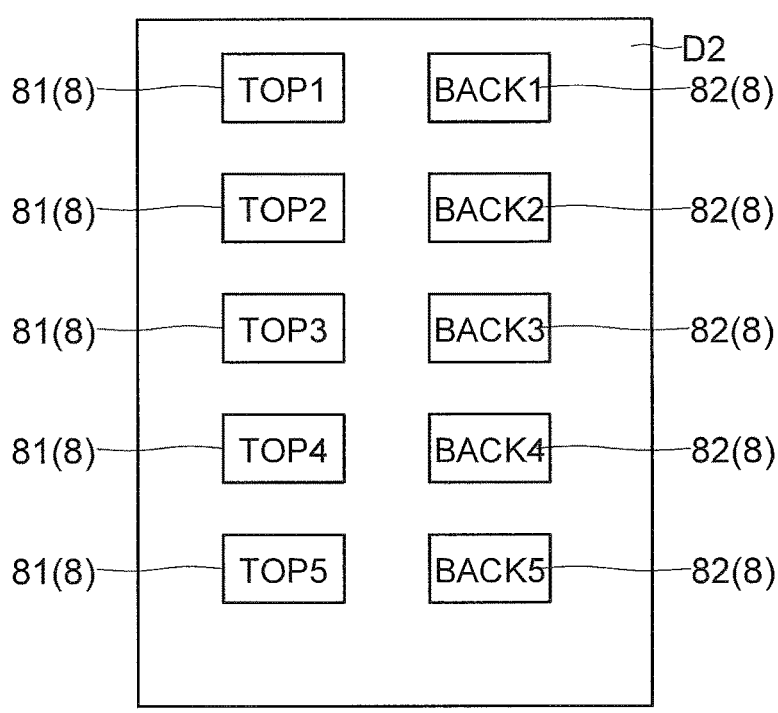
FIG. 18 is a view showing an example of arrayed image data according to the embodiment.

When the HORIZONTAL ARRAY button B17 is operated, the array processing part 76 generates arrayed image data D2 in which a first card image 81 and a second card image 82 of each combination are arrayed in the horizontal direction. FIG. 18 shows an example of the arrayed image data D2 in which a first card image 81 and a second card image 82 of each combination are arrayed in the horizontal direction.

When the CARD REPRODUCTION button B18 is operated, the array processing part 76 does not generate arrayed image data D2 in which card images 8 are disposed in such a fashion that a first card image 81 and a second card image 82 combined together are arrayed next to each other. The array processing part 76 generates arrayed image data D2 in such a fashion that card images 8 can be reproduced. When the CARD REPRODUCTION button B18 is operated, the array processing part 76 generates top-side arrayed image data D2a and back-side arrayed image data D2b.

The array processing part 76 disposes the first card images 81 in the top-side arrayed image data D2a. The array processing part 76 disposes the second card images 82 in the back-side arrayed image data D2b. As a result, only images of one side of card-like like document sheets are disposed in the top-side arrayed image data D2a. Also, only images of the other side of the card-like document sheets are disposed in the back-side arrayed image data D2b.

Furthermore, the array processing part 76 disposes the first card images 81 and the second card images 82 in such a fashion that when double-side surfaces of a sheet are printed with use of the top-side arrayed image data D2a and the back-side arrayed image data D2b, each second card image 82 combined with the first card image 81 is printed at a position identical to a printing position of the first card image 81. A first card image 81 and a second card image 82 which are combined with each other are obtained by reading an identical document sheet. The first card image 81 and the second card image 82 are equal or generally equal in size to each other. For example, the array processing part 76 sets at least concurrence between one corner position of a first card image 81 and one corner position of a second card image 82 combined therewith. For example, the array processing part 76 sets concurrence between an upper-left corner position (coordinates) of a first card image 81 within the top-side arrayed image data D2a and an upper-left corner position (coordinates) of the second card image 82 within the back-side arrayed image data D2b. In this way, the array processing part 76 generates arrayed image data D2 in such a fashion that the combinational second card image 82 is printed on the back side of a cut-out sheet of the first card image 8. Thus, cutting the card image 8 out of the sheet allows the card-like document sheet to be reproduced.

Figure 19:
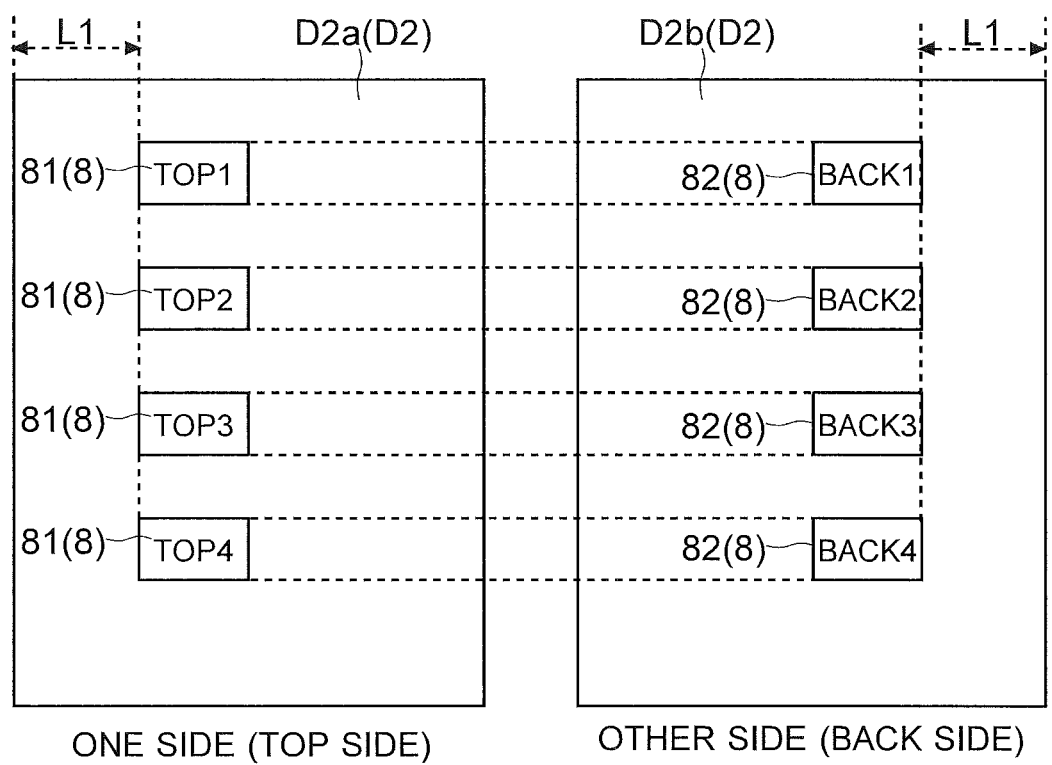
FIG. 19 is a view showing an example of arrayed image data according to the embodiment.

FIG. 19 shows an example of the top-side arrayed image data D2a and the back-side arrayed image data D2b. In FIG. 19, a vertical position of the first card image 81 of 'TOP 1' and a vertical position of the second card image 82 of 'BACK 1' are concurrent with each other. Also, a vertical position of the first card image 81 of 'TOP 2' and a vertical position of the second card image 82 of 'BACK 2' are concurrent with each other. This is similarly applicable also to a combination of 'TOP 3' and 'BACK 3' as well as a combination of 'TOP 4' and 'BACK 4.

For printing at an identical position between top and back in double-side printing, individual images need to be disposed so as to be in line symmetry with respect to a center line (vertical center line) of image data. Therefore, as shown in FIG. 19, a distance from a left end of a page to a left end of each first card image 81 and a distance from a right end of the page to a right end of each second card image 82 are each L1, equally. As a result, the individual second card images 82 are printed on the exactly back side of the individual first card images 81 printed on one side of a sheet, respectively.

When the UNNECESSARY button B19 is operated, the array processing part 76 generates arrayed image data D2 including no borderlines between the individual card images 8. When the NECESSARY button B9 is operated, the array processing part 76 generates arrayed image data D2 including borderlines between the individual card images 8.

As described above, the touch panel 52 and the hard keys 53 accept setting operations by the user in the confirmation screen S3 and the array setting screen S4. The control unit 1 recognizes setting contents based on outputs of the touch panel 52 and the hard keys 53. When the COMPLETE button B21 is operated, the array processing part 76 (image processing unit 7) generates arrayed image data D2 responsive to the settings (Step #226). The generated arrayed image data D2 are stored in the storage unit 2 (see FIG. 1). The stored arrayed image data D2 are usable for print jobs and transmission jobs. Thus, this flow is terminated (END).

The array processing part 76 generates arrayed image data D2 responsive to setting operations performed on the confirmation screen S3 and the array setting screen S4. The array processing part 76 generates arrayed image data D2 of a selected output size. The array processing part 76 recognizes first card images 81 for which the first INVERSION button B12 has been operated. With respect to the first card images 81 for which the first INVERSION button B12 has been operated, the array processing part 76 makes inverted (180°-turned) first card images 81 included in the arrayed image data D2. The array processing part 76 recognizes second card images 82 for which the second INVERSION button B13 has been operated. With respect to the second card images 82 for which the second INVERSION button B13 has been operated, the array processing part 76 makes inverted second card images 82 included in the arrayed image data D2.

When the VERTICAL ARRAY button B16 is operated, the array processing part 76 generates arrayed image data D2 in which a first card image 81 and a second card image 82 of each combination are arrayed in the vertical direction. When the HORIZONTAL ARRAY button B17 is operated, the array processing part 76 generates arrayed image data D2 in which a first card image 81 and a second card image 82 of each combination are arrayed in the horizontal direction. When the CARD REPRODUCTION button B18 is operated, the array processing part 76 generates arrayed image data D2 that allows card-like document sheets to be reproduced.

As described above, the image reading apparatus (multi-function peripheral 200) according to this embodiment includes the operation unit (touch panel 52, hard keys 53), the image reading unit 4, the card-image recognition part 71, the circular-area setting part 72, the positional-information setting part 73, the deviational-angle computation part 74, the corrected-data acquisition part (communication unit 6), and the array processing part 76. The operation unit accepts operations by the user. The image reading unit 4 reads a plurality of document sheets set on the contact glass 41 to generate read image data D1. The card-image recognition part 71 recognizes card images 8 included in the read image data D1 and corresponding to document sheets, respectively. The circular-area setting part 72 sets circular areas 9 on a card image 8 basis so that each circular area 9 contains a whole card image 8. The positional-information setting part 73 sets positional information representing positions of the individual circular areas 9. The deviational-angle computation part 74 determines deviational angles of the card images 8 relative to a predetermined direction on a card image 8 basis. Based on the positional information and the deviational angles, the corrected-data acquisition part acquires corrected image data including card images 8 corrected in terms of deviational inclination through turning of the circular areas 9. Based on the corrected image data, the array processing part 76 generates arrayed image data D2 in which the card images 8 corrected in terms of deviational inclination are disposed in array.

As a result, image data (arrayed image data D2) in which the individual card images 8 are arrayed without deviational inclinations of those card images 8 can be obtained. Without the need for any particular operation by the user, the arrayed image data D2 can be obtained easily and automatically. Moreover, the user is not necessitated to set a plurality of card-like document sheets for alignment in terms of position and angle.

Further, the image reading apparatus includes the combination setting part 75. The image reading unit 4 reads a plurality of document sheets set on the contact glass 41 to generate first read image data. After the generation of the first read image data, the image reading unit 4 also reads a plurality of document sheets to generate second read image data. The card-image recognition part 71 recognizes first card images 81 which are card images 8 included in the first read image data. The card-image recognition part 71 also recognizes second card images 82 which are card images 8 included in the second read image data. The circular-area setting part 72 sets first circular areas 91 as circular areas 9 for the individual first card images 81, respectively. The circular-area setting part 72 also sets second circular areas 92 as circular areas 9 for the individual second card images 82, respectively. The positional-information setting part 73 sets first positional information as positional information for the individual first circular areas 91, respectively. The positional-information setting part 73 also sets second positional information as positional information for the individual second circular areas 92, respectively. The angle computation part determines first deviational angles as deviational angles for the individual first card images 81, respectively. The angle computation part also determines second deviational angles as deviational angles for the individual second card images 82, respectively. The corrected-data acquisition part turns each first circular area 91 based on the first positional information and the first deviational angle to acquire first corrected image data which have been corrected in terms of deviation of the first card images 81. The corrected-data acquisition part turns each second circular area 92 based on the second positional information and the second deviational angle to acquire second corrected image data which have been corrected in terms of deviation of the second card images 82. Based on positional overlaps between the first circular areas 91 and the second circular areas 92, the combination setting part 75 combines each one first card image 81 with one second card image 82. The array processing part 76 generates arrayed image data D2 in which the card images 8 having been corrected in terms of deviational inclination are disposed in such a fashion that combined first card image 81 and second card image 82 are placed next to each other.

As a result, it is easily achievable to obtain arrayed image data D2 in which card images of one side and the other side of each identical card-like document sheet are placed next to each other. By such next-to-each-other placement, it is made unnecessary to seek a back-side image corresponding to one top-side image of a document sheet from among images of a plurality of card-like document sheets. It is implementable to array the card images 8 which have been corrected in terms of deviational inclination while managing the treatment of the double-side printed card-like document sheets.

Further, the image reading apparatus includes a display part (display panel 51) for displaying the confirmation part S3. The display part displays the combined first card images 81 and second card images 82 in the confirmation screen S3. As a result, it can be confirmed whether or not each combination of a first card image 81 and a second card image 82 is correct. In other words, it is made possible to confirm whether images of one side and the other side of each identical card-like document sheet are combined together.

Further, the combination setting part 75 combines together a first card image 81 and a second card image 82 of a circular area 91 and a second circular area 92, respectively, which are overlapping with each other. When a ratio resulting from dividing an overlapping area of a first circular area 91 and a second circular area 92 by a total area of the first circular area 91 is equal to or less than a predetermined reference ratio, the display part displays either one or both of the first card image 81 and the second card image 82 with use of a predetermined caution color. As a result, only turning over the document sheet after the first-time reading allows a one-side image and the other-side image of an identical card-like document sheet to be associated with each other. Also, with a less overlap between the circular areas 9, there is a possibility that the combination is incorrect. Displaying with the caution color can indicate that the combination is highly likely incorrect. The user can be alerted to caution.

When the operation unit accepts a changing operation (operation of the REPLACE button B14) for changing a second card image 82 to be combined with a first card image 81, the combination setting part 75 changes the second card image 82 which is to be combined with the first card image 81 and which has been subjected to the changing operation. As a result, the second card image 82 to be combined with the first card image 81 can be changed. Images of top and back sides of an identical card-like document sheet can be combined with each other. In other words, a correct combination of a first card image 81 and a second card image 82 can be obtained.

When the operation unit accepts a card reproduction operation (operation of the CARD REPRODUCTION button B18) for implementing card reproduction, the array processing part 76 does not generate arrayed image data D2 in which a first card image 81 and a second card image 82 of each combination are placed next to each other. The array processing part 76 generates top-side arrayed image data D2a and back-side arrayed image data D2b. The array processing part 76 disposes the first card images 81 in the top-side arrayed image data D2a, and disposes the second card images 82 in the back-side arrayed image data D2b. The array processing part 76 disposes the first card images 81 and the second card images 82 in such a fashion that when double-side surfaces of a sheet are printed with use of the top-side arrayed image data D2a and the back-side arrayed image data D2b, each second card image 82 combined with a first card image 81 is printed at a position identical to a printing position of the first card image 81. As a result, the second card image 82 is printed on the back side of the corresponding first card image 81. Still, the second card image 82 is printed at a position concurrent with the first card image 81. Cutting out the printed portion allows the card-like document sheet to be reproduced.

Further, the operation unit accepts settings for the way of arraying the card images 8 in the arrayed image data D2. The array processing part 76 generates arrayed image data D2 in which card images 8 corrected in terms of deviational inclination are arrayed according to the set way of array. As a result, the individual card images 8 can be arrayed according to a way of array which is desirable for the user. The user is allowed to obtain arrayed image data D2 in a desired aspect.

The array processing part 76 also decides whether any low-density card images 8 are present or absent, and disposes card images 8 decided as low density into a specific area Fa within the arrayed image data D2. Images that are unclear as to whether to be treated as card-like document sheets (card images 8) can be placed in a certain area.

The array processing part 76 further generates arrayed image data D2 in which a borderline is provided between one card image 8 and another card image 8. As a result, borderlines can be included in the arrayed image data D2. For users who desire to cut out individual card images 8, respectively, the card images 8 may be cut off along the borderlines.

The operation unit accepts a setting for the left/right spacing of the card images 8 in the arrayed image data D2. In other words, the operation unit (touch panel 52) accepts an operation on the first left/right spacing button B4 or the second left/right spacing button B5. The array processing part 76 changes the width of the left/right spacing between the card images 8 in the arrayed image data D2 according to the setting for the left/right spacing. The array processing part 76 sets the left/right spacing to the first spacing or the second spacing.

The operation unit accepts a setting for the up/down spacing of the card images 8 in the arrayed image data D2. In other words, the operation unit (touch panel 52) accepts an operation on the first up/down spacing button B6 or the second up/down spacing button B7. The array processing part 76 changes the width of the up/down spacing between the card images 8 in the arrayed image data D2 according to the setting for the up/down spacing. The array processing part 76 sets the up/down spacing to the third spacing or the fourth spacing.

The operation unit accepts a setting for inversion of card images 8. In other words, the operation unit (touch panel 52) accepts an operation on the INVERSION button B2, the first INVERSION button B12, or the second INVERSION button B13. With respect to card images 8 for which the setting for inversion has been applied, the array processing part 76 makes 180°-turned card images 8 included in the arrayed image data D2.

The image reading system 100 includes the above-described image reading apparatus, and the image processing apparatus 300 communicatable with the image reading apparatus. The image reading apparatus transmits, to the image processing apparatus 300, the read image data D1, positional information as to the individual circular areas 9, and deviational angles of the individual circular areas 9. Based on the positional information and the deviational angles, the image processing apparatus 300 corrects deviations by turning the circular areas 9 to generate corrected image data, and then transmits the corrected image data to the corrected-data acquisition part.

There are some cases where the image reading apparatus is limited in terms of hardware or software for performing image processing. In other words, there are some cases where the angle to which image data can be turned by the image reading apparatus is limited. In such cases, the image processing apparatus 300 substitutively acts for the turning processing. Then, the image reading apparatus acquires corrected image data which have been properly corrected in terms of deviational inclinations of the card images 8. Accordingly, the image reading apparatus does not need to be provided with any high-advanced turning processing function. The hardware of the image reading apparatus can be made simple and low-cost.

Although an embodiment of this disclosure has been fully described hereinabove, yet the disclosure is not limited to the scope of the description and may be modified in various ways unless those modifications depart from the gist of the disclosure.

What is claimed is:

1. An image reading apparatus comprising:
    an operation unit which accepts an operation by a user;
        an image reading unit which reads a plurality of document sheets set on a contact glass to generate read image data;
        a card-image recognition part which recognizes card images which are included in the read image data and which are images corresponding to the document sheets, respectively;
        a circular-area setting part which sets circular areas each containing a whole one of the card images on a card-image basis;
        a positional-information setting part which sets positional information representing positions of the individual circular areas;
        a deviational-angle computation part which determines deviational angles of the individual card images relative to a predetermined direction on a card-image basis;
        a corrected-data acquisition part which acquires corrected image data including the card images which have been corrected in terms of deviational inclination by turning the circular areas, respectively, based on the positional information and the deviational angles; and
        an array processing part which generates arrayed image data in which the card images corrected in terms of deviational inclination are disposed in array based on the corrected image data.

2. The image reading apparatus according to claim 1, further comprising
    a combination setting part, wherein
    the image reading unit:
        reads the plural document sheets set on the contact glass to generate first read image data; and
        after the generation of the first read image data, reads the plural document sheets to generate second read image data,
    the card-image recognition part:
        recognizes first card images which are the card images included in the first read image data; and
        recognizes second card images which are the card images included in the second read image data,
    the circular-area setting part:
        sets first circular areas as the circular areas for the individual first card images, respectively; and
        sets second circular areas as the circular areas for the individual second card images, respectively,
    the positional-information setting part:
        sets first positional information as the positional information for the individual first circular areas, respectively; and sets second positional information as the positional information for the individual second circular areas, respectively, the angle computation part:
   determines first deviational angles as the deviational angles for the individual first card images, respectively; and
   determines second deviational angles as the deviational angles for the individual second card images, respectively, the corrected-data acquisition part:
   acquires first corrected image data corrected in terms of deviation of the first card images by turning the first circular areas based on the first positional information and the first deviational angles; and
   acquires second corrected image data corrected in terms of deviation of the second card images by turning the second circular areas based on the second positional information and the second deviational angles, the combination setting part combines one of the first card images with one of the second card images based on positional overlaps between the first circular areas and the second circular areas, and the array processing part generates the arrayed image data in which the card images corrected in terms of deviational inclination are disposed such that the first card image and the second card image combined with each other are placed next to each other.

3. The image reading apparatus according to claim 2, further comprising
   a display part which displays a confirmation screen, wherein
   the display part displays, in the confirmation screen, the first card image and the second card image combined with each other.

4. The image reading apparatus according to claim 3, wherein
   the combination setting part
      combines together one of the first card images and one of the second card images contained in one of the first circular areas and one of the second circular areas, respectively, overlapping with each other, and
      when a ratio resulting from dividing an overlapping area between the first circular area and the second circular area by a total area of the first circular area is equal to or less than a predetermined reference ratio,
      the display part displays either one or both of the first card image and the second card image with use of a predetermined caution color.

5. The image reading apparatus according to claim 2, wherein
   when the operation unit has accepted a changing operation for changing the second card image to be combined with the first card image,
   the combination setting part changes the second card image which is to be combined with the first card image and which has been subjected to the changing operation.

6. The image reading apparatus according to claim 2, wherein
   when the operation unit has accepted a card reproduction operation for reproducing a card,
   the array processing part
      without generating the arrayed image data in which the card images are disposed such that the first card image and the second card image combined with each other are placed next to each other,
      generates top-side arrayed image data and back-side arrayed image data,
      disposes the first card images in the top-side arrayed image data,
      disposes the second card images in the back-side arrayed image data, and disposes the first card images and the second card images in such a fashion that when double-side surfaces of a sheet are printed with use of the top-side arrayed image data and the back-side arrayed image data, each second card image combined with a first card image is printed at a position identical to a printing position of the combined first card image.

7. The image reading apparatus according to claim 1, wherein
   the operation unit accepts a setting for a way of arraying the card images in the arrayed image data, and
   the array processing part generates the arrayed image data in which the card images corrected in terms of deviational inclination are arrayed by the set way of array.

8. The image reading apparatus according to claim 1, wherein
   the array processing part decides whether any low-density card images are present or absent among the card images, and disposes those of the card images decided as low-density in a particular area provided in the arrayed image data.

9. The image reading apparatus according to claim 1, wherein
   the array processing part generates the arrayed image data with borderlines added between the card images.

10. The image reading apparatus according to claim 1, wherein
    the operation unit accepts a setting for left/right spacing of the card images in the arrayed image data, and
    responsive to the setting for the left/right spacing, the array processing part changes a width of the left/right spacing of the card images in the arrayed image data.

11. The image reading apparatus according to claim 1, wherein
    the operation unit accepts a setting for up/down spacing of the card images in the arrayed image data, and
    responsive to the setting for the up/down spacing, the array processing part changes a width of the up/down spacing of the card images in the arrayed image data.

12. The image reading apparatus according to claim 1, wherein
    the operation unit accepts a setting for inversion of the card images, and with respect to card images out of the card images that have been subjected to
    the setting for inversion, the array processing part makes the card images, which have been turned to 180°, included in the arrayed image data.

13. An image reading system comprising the image reading apparatus as defined in claim 1, and an image processing apparatus communicatable with the image reading apparatus, wherein
    the image reading apparatus transmits the read image data, the positional information as to the individual circular areas, and the deviational angles of the individual circular areas, respectively, to the image processing apparatus, and
    the image processing apparatus
      based on the positional information and the deviational angles, generates the corrected image data corrected in terms of deviation by turning the circular areas, and transmits the corrected image data to the corrected-data acquisition part.

14. An image-reading-apparatus control method comprising the steps of:

accepting an operation by a user;

reading a plurality of document sheets set on a contact glass to generate read image data;

recognizing card images which are included in the read image data and which correspond to the individual document sheets, respectively;

setting circular areas for the individual card images on a card-image basis such that each circular area contains a whole one of the card images;

setting positional information representing positions of the individual circular areas, respectively;

determining deviational angles of the individual card images relative to a predetermined direction on a card-image basis;

based on the positional information and the deviational angles, acquiring corrected image data including the card images corrected in terms of deviational inclination by turning the circular areas, respectively; and based on the corrected image data, generating arrayed image data in which the card images corrected in terms of deviational inclination are disposed in array.

* * * * *